United States Patent
Yamaura et al.

(10) Patent No.: US 7,191,310 B2
(45) Date of Patent: Mar. 13, 2007

(54) PARALLEL PROCESSOR AND IMAGE PROCESSING APPARATUS ADAPTED FOR NONLINEAR PROCESSING THROUGH SELECTION VIA PROCESSOR ELEMENT NUMBERS

(75) Inventors: Shinichi Yamaura, Hyogo (JP); Kazuhiko Hara, Hyogo (JP); Takao Katayama, Hyogo (JP); Kazuhiko Iwanaga, Osaka (JP); Hiroshi Takafuji, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 517 days.

(21) Appl. No.: 09/761,122

(22) Filed: Jan. 16, 2001

(65) Prior Publication Data

US 2001/0008563 A1   Jul. 19, 2001

(30) Foreign Application Priority Data

| Jan. 19, 2000 | (JP) | ............................. 2000-009879 |
| Jan. 28, 2000 | (JP) | ............................. 2000-020130 |

(51) Int. Cl.
*G06F 15/80* (2006.01)
(52) U.S. Cl. ...................................................... 712/10
(58) Field of Classification Search ................ 712/10, 712/13, 15, 22; 713/100
See application file for complete search history.

(56) References Cited

U.S. PATENT DOCUMENTS 4,783,738 A * 11/1988 Li et al. ...................... 712/21
4,858,110 A * 8/1989 Miyata ......................... 712/11
5,430,885 A * 7/1995 Kaneko et al. ............... 712/12
5,600,811 A * 2/1997 Spielman et al. ........... 712/203
6,363,453 B1 * 3/2002 Esposito et al. .............. 711/2
6,581,152 B2 * 6/2003 Barry et al. .................. 712/24

FOREIGN PATENT DOCUMENTS

| JP | 5067203    | 3/1993  |
| JP | 9-198231   | 7/1997  |
| JP | 9-265543   | 10/1997 |
| JP | 9-305550   | 11/1997 |
| JP | 9305550    | 11/1997 |
| JP | 2812292    | 8/1998  |

OTHER PUBLICATIONS

Hennessey and Patterson, "Computer Architecture—A Quantitative Approach, 2nd Edition," 1996, p. 75, 100.*
Hennessy and Patterson, "Computer Architecture—A Quantitative Approach, $2^{nd}$ Edition," 1996, pp. 40-41, 130.*

* cited by examiner

*Primary Examiner*—Eddie Chan
*Assistant Examiner*—David J. Huisman
(74) *Attorney, Agent, or Firm*—Cooper & Dunham LLP

(57) ABSTRACT

A parallel processor includes a global processor which interprets a program and controls the entirety of the parallel processor. A processor-element block includes a plurality of processor elements each comprising a register file and an operation array for processing a plurality of sets of data. The global processor outputs a control signal to the plurality of processor elements, and, thereby, sets processor-element numbers corresponding to the plurality of processor elements as input values of the operation arrays, respectively.

12 Claims, 16 Drawing Sheets

FIG. 3

PARALLEL PROCESSOR AND IMAGE PROCESSING APPARATUS ADAPTED FOR NONLINEAR PROCESSING THROUGH SELECTION VIA PROCESSOR ELEMENT NUMBERS

BACKGROUND OF THE INVENTION

1. Field of the Invention

The present invention generally relates to a parallel processor used for digital data processing of image data or the like in a digital copier, a facsimile machine or the like, and, in particular, to a microprocessor used for non-linear processing of image data and employing an SIMD (Single Instruction-stream Multiple Data-stream) method in which same processing is performed on a plurality of sets of data by a same instruction, and an image processing apparatus employing the processor.

2. Description of the Related Art

Recently, in image processing in a digital copier, a facsimile machine or the like, improvement of image quality is rendered by increasing the number of pixels, providing color images, using variable types of image processing and so forth. As the image quality increases, the amount of image data to be processed increases, and the image processing method becomes complicated. In such a sort of image processing, there are many cases where same processing is performed on a plurality of sets of data. For this purpose, a processor in an SIMD method in which a plurality of sets of data is processed by a single instruction is used in many cases.

In such an SIMD processor, a plurality of processor elements (PE) each having an arithmetic and logic unit and a register file for enabling a plurality of sets of data to be processed at once are provided. Further, in order to control the entirety of the processor by a program, a global processor having a program interpreting part, a control part, an arithmetic and logic unit, registers, and memories is provided.

When data is transferred from the global processor to the processor elements, data shift is performed through shift registers provided to the respective processor elements and all connected to form a chain configuration together with the global processor connected to one end of the processor elements, or data is directly transferred via buses connected to the respective processor elements.

In the case where data shift is performed through the processor elements, shift should be made for all the processor elements. In the case where data is directly transferred through the buses, and data rewriting is performed, data is rewritten for all the processor elements, or specific processor elements are selected by selection signals from the control part, and rewriting is performed. Only one instruction cycle is needed for rewriting for one processor element. However, a plurality of instruction cycles are needed for a plurality of processor elements.

In a normal operation in a processor element, it is determined from an execution condition flag whether or not operation is to be performed. The execution condition flag is set/reset according to a result of operation performed by an operation array, or is directly set/reset by a control signal from the control part of the global processor.

In an SIMD processor in the related art, such data rewriting is made by using an operation result, or setting/resetting is performed by transfer of data to the execution condition flags for all the processor elements. However, in a case where only specific processor elements need operation, for example, only processor elements in a certain range need operation, or only every n-th processor element (n=1, 2, 3, . . . ) thereof needs operation, it is difficult to make setting of the execution condition flags only for relevant processor elements. For this purpose, the execution condition flags are set as a result of data being set different between relevant processor elements and the other processor elements intentionally, or setting of the execution condition flags being made for the relevant processor elements one by one.

Further, as the amount of image data to be processed increases and the data processing method becomes complicated, the amount of data to be processed at once increases, and the number of processor elements needed increases. When the number of processor elements increases, the number of test patterns needed for logical testing, IC testing and so forth increases. In order to perform a test performed on a single processor element on all the processor elements, the number of test patterns the same as the number of the processor elements are needed. Further, it is necessary to provide circuits needed for testing and ports through which test results are output for all the processor elements.

As mentioned above, in the SIMD processor, it is possible to perform same operation processing on a plurality of sets of data by a single instruction simultaneously. In normal operation processing, such a method is rendered through a plurality of arithmetic and logic units provided in parallel through which same operation is performed on a plurality of sets of data simultaneously. However, in image processing, non-linear processing may be performed in which operation processing cannot be expressed by formulas. In such non-linear processing, an operation formula is changed according to data for which operation is performed. Accordingly, it is not possible to perform same processing simultaneously. Thereby, data is processed one by one, and, as a result, the advantages of the SIMD processor cannot be utilized.

In the normal SIMD processor, for performing non-linear processing in which an operation formula is changed according to operation data, in order to prevent a software program from becoming very complicated, such a method is common that, all possible data to be obtained through operation is previously obtained for operation data, and a table is previously formed therefrom, and, then, the table is used to convert given operation data into data to be obtained through the operation. Specifically, the table is stored in a RAM, data to undergo operation is added to the top address of the table, and, thus-obtained value is used as an address pointer, and, thereby, data to be obtained through the operation is obtained from the RAM.

In a case where operation data is of 8 bits, the conversion table of 256 bytes is needed. Accordingly, as the bit width of the operation data increases, the size of the conversion table increases by the power of two. Therefore, when the bit width of operation data is large, the operation data is divided into arbitrary sections, and an approximate formula for each section is prepared as a table.

In a case where such table conversion is employed in an SIMD processor, the table is needed for each unit of operation. For example, when the SIMD processor includes 256 processor elements (PEs) and performs table conversion of 8 bits, a table RAM of 256 bytes is needed for each operation unit. Accordingly, a total of 256 table RAMs are needed. Accordingly, the SIMD processor is very expensive. In order to solve this problem, various methods have been proposed.

Japanese Laid-Open Patent Application No. 5-67203 discloses that data used for operation is output from an output register built in a PE in each SIMD unit, table conversion is performed one by one externally, and the result of table conversion is input to an input register built in the PE one by one. In this method, only the single conversion table is needed. Accordingly, it is possible to prevent the cost from increasing. However, because data is processed one by one, the operation processing time amounts for at least the number of PEs. Accordingly, the operation speed may be problematically low. Further, when this processing is performed in parallel to normal processing in PE, the operation processing time can be reduced at a total. However, input/ output registers are used for the conversion operations, and cannot be used for the other purposes. Accordingly, when the data resulting from the conversion is used for the normal processing, it is necessary to wait for the conversion time. Thereby, parallel processing cannot be rendered. Further, a special table memory is needed, and input shift register and output shift register are used specially for the table conversion.

Japanese Laid-Open Patent Application No. 9-305550 discloses that a comparator for comparing original data of non-linear conversion table with data to be converted is provided for each PE, the comparator compares both data, data obtained through conversion is stored in the PE for which the comparison result is coincidence, and the data is used as data obtained through the operation. In this method, the operation processing time amounts for the number of combinations of values which data used for operation can have (the number of words of the conversion table). Accordingly, it is possible to improve the processing speed in a case where the number of words is smaller than the number of PEs. In a case of 8-bit data, the number of cycles amounts to on the order of 256 times regardless of the number of PEs. Also in this case, the operation processing time is long. Further, in a case where this processing is performed in parallel with other processing, this method has the same problem as that in the method of Japanese Laid-Open Patent Application No. 5-67203. Further, the special comparator is needed.

Japanese Patent No. 2812292 discloses that data used for operation is given as an address pointer by each PE to a RAM for a conversion table having output ports, the number of which is the same as the number of PEs, and, therefrom, data to be obtained through the operation is obtained. In this method, the operation processing time amounts to the order of one cycle. However, increase of the number of output ports results in increase of costs. In particular, it is not possible to render the RAM having the ports, the number of which exceeds tens. Accordingly, this method cannot be applied to an SIMD processor having a large number of PEs.

Thus, in the related arts, the various methods have been proposed for performing parallel processing, which is the main feature of the SIMD processor but is difficult to be rendered for non-linear processing such as that table conversion is needed to be performed therefor. However, these methods are those using the input/output registers, using the special comparator, and using the special table memory, and have problems in processing speed or in the costs, as described above

SUMMARY OF THE INVENTION

An object of the present invention is to reduce the number of instruction execution cycles in image data processing by providing effective instructions and a part rendering the instructions.

Another object of the present invention is to provide a parallel processor by which non-linear processing can be effectively rendered.

A parallel processor comprising:
a global processor interpreting a program and controlling the entirety of the processor; and
a processor-element block comprising a plurality of processor elements each comprising a register file and an operation array for processing a plurality of sets of data,
wherein the global processor provides an instruction for setting processor-element numbers to all the processor elements, outputs a control signal through execution of the instructions, and uses the processor-element number corresponding to each processor element as an input value of the operation array.

Thereby, according to the control signal from the global processor, the number of the processor element (PE) can be input to the A-register of the processor element, as shown in FIG. 2. The PE number stored in each processor element can be used in testing of the processor element. For example, it is possible to use it when PE shift is tested.

In the related art, same values are set into the A-registers, and the values of all the A-registers are output, or different values are transferred to the A-registers of all the processor elements, one by one, and the global processor compares them. In the former method, the number of wires are very large and the costs increase. In the latter method, 256 cycles are needed only for the instruction cycle to set the value (in a case where the number of processor elements is 256). However, in the above-mentioned method according to the present invention, values are set to the A-registers of all the processor elements through an LDPN instruction, and shifted, then, the resulting values are stored in the register files. Then, adding/subtracting is performed on the values set through the LDPN instruction according to the shift amounts and expected values are set, for determination. Then, the above-mentioned resulting values are compared with the expected values. Thereby, the test can be rendered. Only one cycle is needed for setting the values.

Further, through the LDPN, it is possible to specify every n-th processor element. For example, when every fifth processor element (PE0, PE5, PE10, . . . ) is selected, the number of times of processing for the number of processor elements to be selected are needed in the related art because a condition flag is set for each processor element. However, according to the present invention, PE numbers are set into all the processor elements through the LDPN (when values of A-registers of PE0, PE1, PE2, . . . , PE255 are set in sequence, 0, 1, 2, . . . , 255 are set), the value of each A-register is divided by 5, and the remainder is stored (this operation is rendered by repetition of subtraction by ALU and the value remaining in the A-register finally is used as the remainder. This operation can be rendered through removing method or retraction method of dividing operation.). As a result, 0, 1, 2, 3, 4, 0, 1, 2, 3, 4, 0, 1, . . . , 0 are obtained. Then, a CMP instruction (In the CMP instruction, data is compared between the A-register and register file, and the result is reflected in a specified bit of a T-register.) is used in PE instruction. Then, by reflecting the result in the T-register, it is possible to select processor elements for subsequent operation. In the related art, the number of cycles for the number of processor elements to be specified is needed. However, according to the present invention, regardless of the number of processor elements to be specified, selection of the processor elements is completed through 1 cycle for the LDPN, 16 cycles for dividing operation, and 1 cycle for the CMP instruction.

A bus having the bit size of a general-purpose register of the global processor may be provided from this general-purpose register to be connected to the registers of all the processor elements, and, data from the general-purpose register of the global processor may be transferred to arbitrary processor elements of the plurality of processor elements.

Thereby, for example, a G0-register of the global processor is connected to the A-register of each processor element, and the value of the G0-register may be transferred to the A-registers of arbitrary processor elements.

Thus, as shown in FIG. 2, the G0-register of the global processor is connected via the bus to the A-registers of all the processor elements, and, by using an MGAA or MGAB instruction, it is possible to transfer the value of the G0-register to the A-registers of arbitrary processor elements.

Further, a comparator may be provided for comparing the input number of processor element with the upper limit and lower limit of specifying a range specified by using immediate values. Thus, the data transfer is rendered through specifying the range from a first specific processor element through a second specific processor element by specifying the immediate values by using operands. Thereby, only specific processor elements are controlled.

In the related art, when data transfer for a certain range of processor elements is rendered, execution condition flags for the range are, set one by one, and, according to the set execution condition flags, whether or not transfer is to be made is determined. Accordingly, the number of cycles for the number of times of transfer is needed. However, when employing the above-mentioned configuration according to the present invention, by using MGAA instruction by which processor elements in a certain range can be specified, the same processing can be rendered through one cycle.

Thus, by using the MGAA instruction, the comparator shown in FIG. 5 is provided for each processor element, the comparator compares the PE number held by each processor element with the upper value and lower value specified through the immediate-value operands. Then, when it is within the range, the operation of the processor element is performed. Execution/non-execution is controlled without the A-register updating the result of the ALU (without updating the latch signal).

The data transfer may be rendered through specifying bits such as to specify processor elements matching processor-element numbers expressed in binary notation; and specifying processor elements by masking arbitrary bits of the thus-specified bits, through specifying the immediate values by using the operands. For this purpose, a pattern matching block is provided for selecting processor elements by using the given processor-element number, specifying a range using a bit pattern of immediate values, and specifying bit-masking through masking by using a bit pattern of immediate values. Thereby, specific processor elements are controlled.

Thereby, it is possible to specify every N-th processor element such as every other processor element, every third processor element, or the like, and to transfer data thereto, through a mask pattern circuit shown in FIG. 5 provided for each processor element to perform bit-masking specifying.

The data transfer may be rendered through specifying by a pointer using a general-purpose register of the global processor. For this purpose, the value of the general-purpose register is transferred to the comparator or pattern matching block.

Thereby, it is possible to store the result of operation according to global-processor instruction in the general-purpose register of the global processor, and to render dynamic specifying.

Thus, as shown in FIG. 5, G2 and G3-registers of the global processor are connected with all the processor elements via buses, and selection is made between the values from the G2 and G3-registers and immediate data from the SCU. Thereby, it is possible to render specifying through the G2 and G3-registers. Thereby, it is possible to store the result of operation according to global-processor instructions into the G2 and G3-registers, and to render dynamic specifying thereby.

The specifying by a pointer may comprise incrementing of data in the general-purpose register after the specifying.

Thereby, it is possible to add 1 after the operation, and to reduce the subsequent operation range.

Thus, the global processor can add to the value of the G2-register by the ALU. Accordingly, by providing incrementing instruction into the operand, it is possible to add 1 after the operation, and to reduce the subsequent operation range.

Each processor element may comprise a plurality of flag bits for controlling as to whether or not the result of the operation is to be stored in a register, which flag bits can be set/reset according to the result of the operation or a control signal from the global processor. A logical operation is performed on the state of flag bits before the setting/resetting and the value to be newly set/reset. An AND/OR logical operator is provided, and the value obtained through the operation is set/reset into the flag bits.

The specifying of the flag bits may be rendered by specifying the range from the first specific processor element through the second specific processor element through specifying the immediate values by using the operands.

The specifying of the flag bits may be rendered through specifying bits such as to specify processor elements matching processor-element numbers expressed in binary notation; and specifying processor elements by masking arbitrary bits of the thus-specified bits, through specifying the immediate values by using the operands.

The specifying of the flag bits may be rendered through specifying by a pointer using a general-purpose register of the global processor.

Thereby, it is possible to specify plurality of skipping irregular areas.

Thus, as shown in FIG. 4, the logical operator performing AND/OR operation on the input data of the T-register is provided, the preceding value of the T-register is made to be fed back, and logical operation is performed on the new value. Thereby, not only setting/resetting of the T-register, but also AND or OR of the values in the T-register can be used. Thereby, it is possible to specify a plurality of skipping irregular areas. When areas such as PE10 through PE15, PE26 through PE40, PE100 through PE111 are to be specified, specific flags of all the processor elements are cleared through SETTA instructions or the like, and, then, OR operation ('/O' is described) is performed three times. Thereby, the above-mentioned specifying is rendered. On the other hand, in the related art, it is necessary to set into target processor elements one by one, and the number of instruction cycles for the number of processor elements to be set are needed.

Specific description is as follows:

LDT #0

Thereby, "0" is transferred to all the bits of the T-registers of all the processor elements. Then,

SETTA/T1/O #10, #15
SETTA/T1/O #26, #40
SETTA/T1/O #100, #111

A parallel processor according to another aspect of the present invention comprises:

a global processor interpreting a program and controlling the entirety of the processor; and a processor-element block comprising a plurality of processor elements each processing data, wherein:

each processor element comprises an operation part, a register file comprising a plurality registers and an operation-result flag; and data from a table memory is stored in at least one register of each of a plurality of processor elements having the same contents of the operation-result flag, simultaneously.

In each processor element, the operation part may compare data to undergo the operation with data to be converted, and, when the data to undergo the operation coincides with the data to be converted, sets a flag as condition satisfaction to the operation-result flag; and data after conversion from the table memory may be stored in the at least one register of each of the plurality of processor elements having the same contents of the operation-result flag, simultaneously.

In each processor element, the operation part may compare data to undergo the operation with data to be converted, and, when the data to undergo the operation is larger than the data to be converted, sets a flag as condition satisfaction to the operation-result flag; and the data after conversion from the table memory may be stored in the at least one register of each of the plurality of processor elements having the same contents of the operation-result flag, simultaneously.

In the configuration, a data transfer bus connecting the table memory to the register of the register file of each processor element, and a control part controlling data transfer from the data transfer bus to the register may be provided; and the control part may store data into the register from the data transfer bus according to a control signal from the global processor and the condition of the operation-result flag.

The data after conversion may comprise data after conversion corresponding to successive $2^n$ sets of data to be converted, and are written to $2^n$ registers from $2^n$ table data buses simultaneously, where n denotes an integer.

A plurality of registers, built in each processor element, which can store data from a table memory simultaneously, can also be used for storing data to undergo operation processing in each processor element.

Data of a table memory to be stored in a plurality of registers may be stored in a memory built in the global processor, and the memory can also be used as a memory for storing data processed in operation of the global processor.

An image processing apparatus according to the present invention, comprises:

an input FIFO and an output FIFO; and a parallel processor comprising a plurality of processor elements which form an array configuration, wherein:

image data is input to the processor via the input FIFO;

the processor processes the image data in parallel; and data having undergone the operation processing by the processor is output via the output FIFO, wherein:

each processor element of the processor comprises an operation part, a register file comprising a plurality of registers, and an operation-result flag;

data after conversion for non-linear processing from a table memory is stored in at least one register of each of a plurality of processor elements having the same contents of the operation-result flag, simultaneously; and the image data having undertone the non-linear processing is output externally.

In each processor element, the operation part may compare data to undergo the operation with data to be converted, and, when the data to undergo the operation is larger than the data to be converted, sets a flag indicating condition satisfaction to the operation-result flag; and the data after conversion from the table memory may be stored in the at least one register of each of the plurality of processor elements having the same contents of the operation-result flag, simultaneously.

A data transfer bus connecting the table memory to the register of the register file of each processor element, and a control part controlling data transfer from the data transfer bus to the register may be provided; and the control part may store data into the register from the data transfer bus according to a control signal from the global processor and the condition of the operation-result flag, simultaneously.

The data after conversion may comprise data after conversion corresponding to successive $2^n$ sets of data to be converted, and are written to $2^n$ registers from $2^n$ table data buses simultaneously, where n denotes an integer.

Thus, according to the present invention, it is possible to control the costs to the limit by needing only one table memory without needing special circuit for comparison. Further, it is possible to reduce the processing time according to the number of registers which receive data after conversion.

Further, by making a configuration such that a plurality of registers built in each processor element which can store data from the table memory simultaneously can also be used for storing data to undergo operation processing in the processor element, data which the operation part uses can be freely written/read to/from the registers which receive data after conversion. Accordingly, it is possible to freely select the necessary number of the registers for the operation processing and the necessary number of the registers for conversion.

Further, data of the table memory to be stored in the plurality of registers is stored in a memory built in the global processor, and this memory can also be used as a memory for storing data in operation by the global processor. Thus, the table RAM can also be used as a data RAM. Accordingly, it is possible to freely select the necessary capacities of the table RAM and data RAM.

Other objects and further features of the present invention will become more apparent from the following detailed description when read in conjunction with the accompanying drawings.

BRIEF DESCRIPTION OF THE DRAWINGS

FIG. 3 is a block diagram showing a partial internal configuration of the SIMD processor shown in FIG. 1;

DESCRIPTION OF THE PREFERRED EMBODIMENTS

Figure 1:
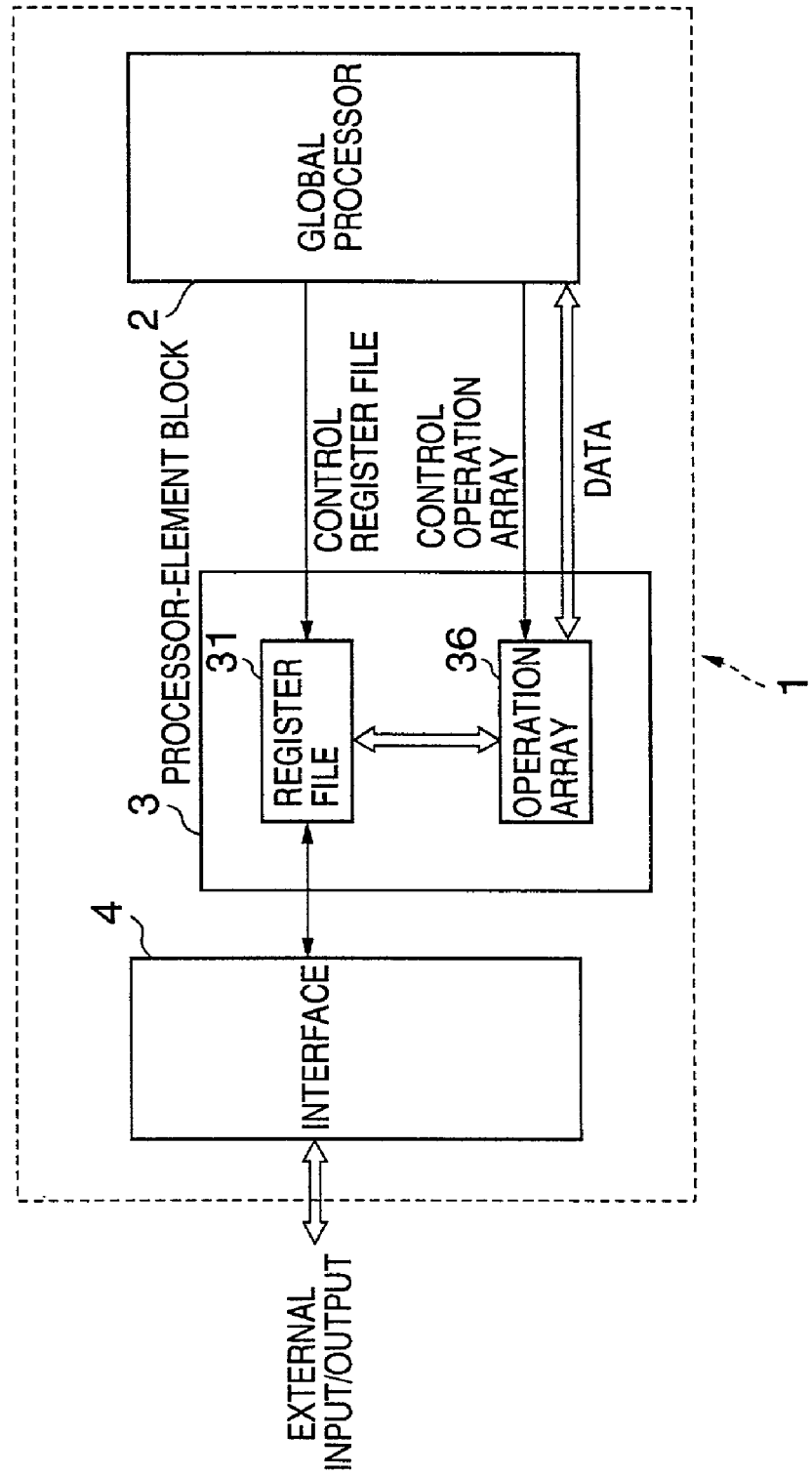
FIG. 1 is a block diagram showing the entire configuration of an SIMD processor in a first embodiment of the present invention.

FIG. 1 shows a block diagram of an SIMD processor in a first embodiment of the present invention.

As shown in FIG. 1, the SIMD processor 1 includes a global processor (GP) 2, a processor-element block 3 including 256 processor elements (PEs) 3a (FIG. 2), and an interface 4. The interface 4 gives data to undergo operation processing provided from an external image scanner, for example, to an input/output register file 31, and, also, transfers data having undergone the operation processing to an external printer or the like from the register file 31, based on instructions given by the global processor 2.

The processor-element block 3 includes the register file 31 which inputs thereto image data from an input device such as a scanner provided outside of the SIMD processor 1, outputs image data therefrom to an output device such as a printer provided outside of the SIMD processor, and inputs/outputs data from/to the global processor 2 via an operation array 36; and the operation array 36 which performs operation processing on data from the register file 36 or data from the global processor 2. In the SIMD method, a plurality of sets of data is processed at once. Accordingly, the processor-element block 3 includes the plurality of processor elements 3a.

The global processor 2 controls the processor-element block 3 and interface 4. The global processor 2 includes a processor employing an SISD method and sends out various control signals.

Figure 2:
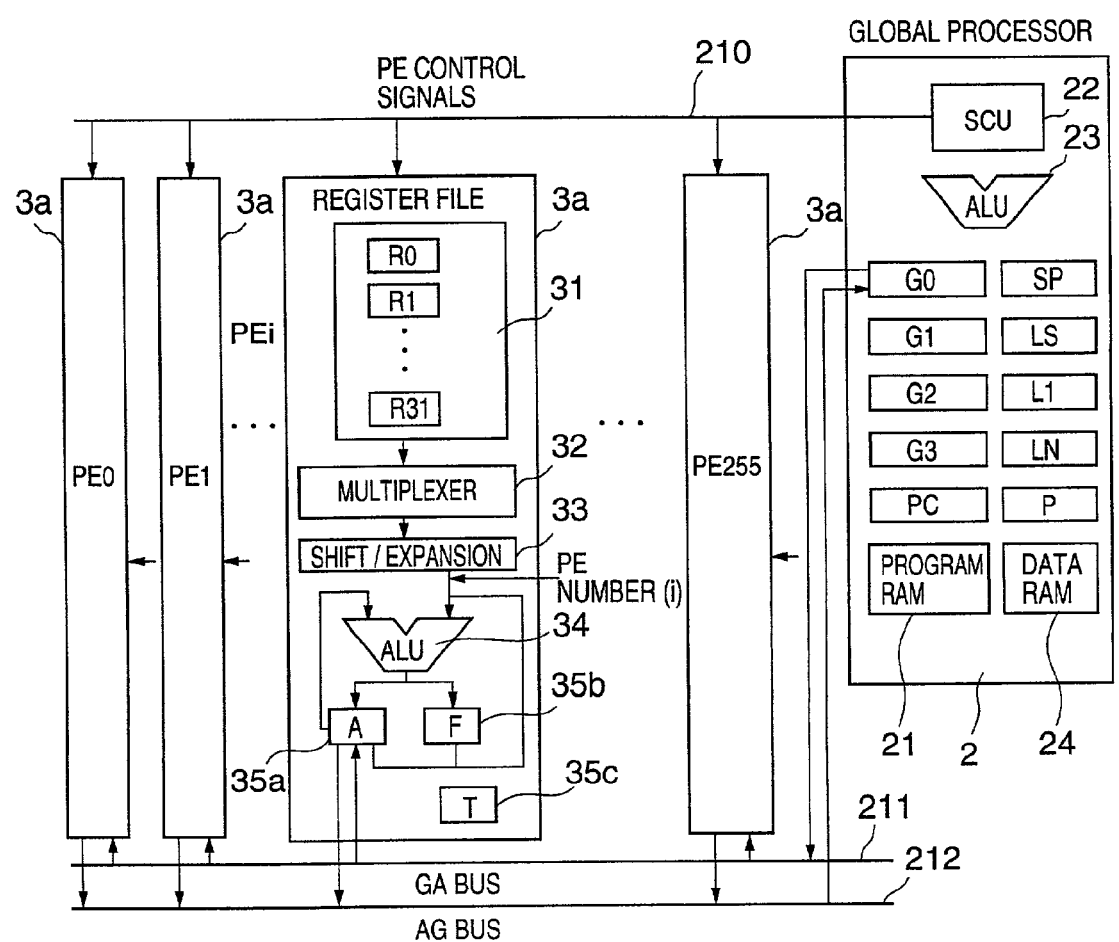
FIG. 2 is a block diagram showing a partial detailed configuration of the SIMD processor shown in FIG. 1.

As shown in FIG. 2, the global processor 2 includes a sequence unit (referred to as SCU, hereinafter) 22 which interprets instructions and generates various control signals, an arithmetic and logic unit (referred to as ALU, hereinafter) 23 which performs arithmetic and logic operations according to global-processor instructions, a program RAM 21 which stores programs of this processor, a data RAM 22 which stores operation data, and, although not shown in the figure clearly, interrupt control circuit, external I/O control circuit and GP operation control circuit.

Further, the global processor 2 has a program counter (PC) holding an address of a program, G0 through G3-general-purpose registers storing data of operation processing, a stack pointer (SP) holding an address in the RAM at which data is saved at a time of register saving and returning, a link register (LS) holding an address of a source from which a subroutine call is made at a time of subroutine call, LI and LN registers holding branch destination addresses at a time of IRQ and at a time of NMI, and a processor status register (P) holding the state of the processor, built therein.

Although not shown in the figure, the above-described SCU 22 includes a GP instruction decoder (referred to as a GDC, hereinafter) interpreting GP instructions and generating control signals to respective blocks mainly in the global processor 2, and a PE-instruction decoder (referred to as a PDC, hereinafter) interpreting processor-element (PE) instructions and generating control signals to respective blocks mainly in the processor-element block 3. That is, instructions provided to this processor include GP instructions for performing operation processing mainly in the global processor 2 and PE instructions for performing operation processing in the processor-element block 3 or between the processor elements 3a.

Further, the operation array 36 of the processor-element block 3 includes a multiplexer 32, a shift and expansion circuit 33, an arithmetic and logic unit 34 (referred to as ALU 34, hereinafter), and an A-register 35a and an F-register 35b.

The SCU 22 of the global processor 2 sends to the interface 4 operation setting data, commands and so forth for data transfer. The interface 4, based on the operation setting data and commands sent from the SCU 22, generates an address control signal for specifying an address for the processor elements 3a, a read/write control signal for giving instructions of data read/write to registers 31b (FIG. 3) of the processor elements 3a and a clock control signal for providing a clock signal.

The read/write control signal includes a write control signal for obtaining data to undergo operation processing from a data bus and causing the data to be held by the register files 31 of the processor elements 3a. The read/write control signal also includes a read control signal for giving instructions to the registers such that data having undergone the operation processing and held by the register files 31 of the processor elements 3a to be given to the data bus.

The processor-element block 3 will now be described in detail with reference to FIG. 3.

The processor-element block 3 assigns two adjacent processor elements 3a an even number and an odd number, treats them as one pair, and assigns them a same address.

The interface 4, when receiving a command from the global processor 2, produces a signal (referred to as an 'addressing signal', hereinafter) for specifying an address of a processor element 3a of the processor elements 3a, and sends the signal to register controllers 31a of the processor elements 3a via an address bus 41a. Further, the interface 4 gives a read/write instruction signal for giving instructions of data read/write to the register controllers 31a of the processor elements 3e via a read/write signal line 45a (45b) for the registers 31b of the processor elements 3a. The even read/write signal line 45a is used for giving the read/write instruction signal to the even processor elements 3a therethrough while the odd read/write signal line 45b is used for giving the read/write instruction signal to the odd processor elements 3a therethrough.

The interface 4 gives the clock signal to the register controllers 31a of the processor elements 3a via a clock signal line 41c.

Further, as mentioned above, image data read through an image scanner or the like provided outside of the SIMD processor 1 is stored in a buffer memory temporarily, not shown in the figure, and the interface 4 inputs thereto the data from the buffer memory as parallel data of 16 bits. The data of 16 bits include 8 bits to be given to the processor elements 3a assigned even numbers respectively and 8 bits to be given to the processor elements 3a assigned odd numbers respectively. Each 8-bit data is given to a respective one of an even data bus 46a and an odd data bus 46b. The parallel data of 8 bits may be changed appropriately according to the data. The data buses 46a and 46b are also used when data having undergone the operation processing and held by the registers 31b is sent out to a printer or the like provided outside of the SIMD processor 1 via a buffer memory.

The registers built in the global processor 2 are connected with the A-registers 35a and F-registers 35b of the processor-element block 3, and transmit/receive data to/from the registers 35a and 35b under control by the SCU 22.

Figure 3:
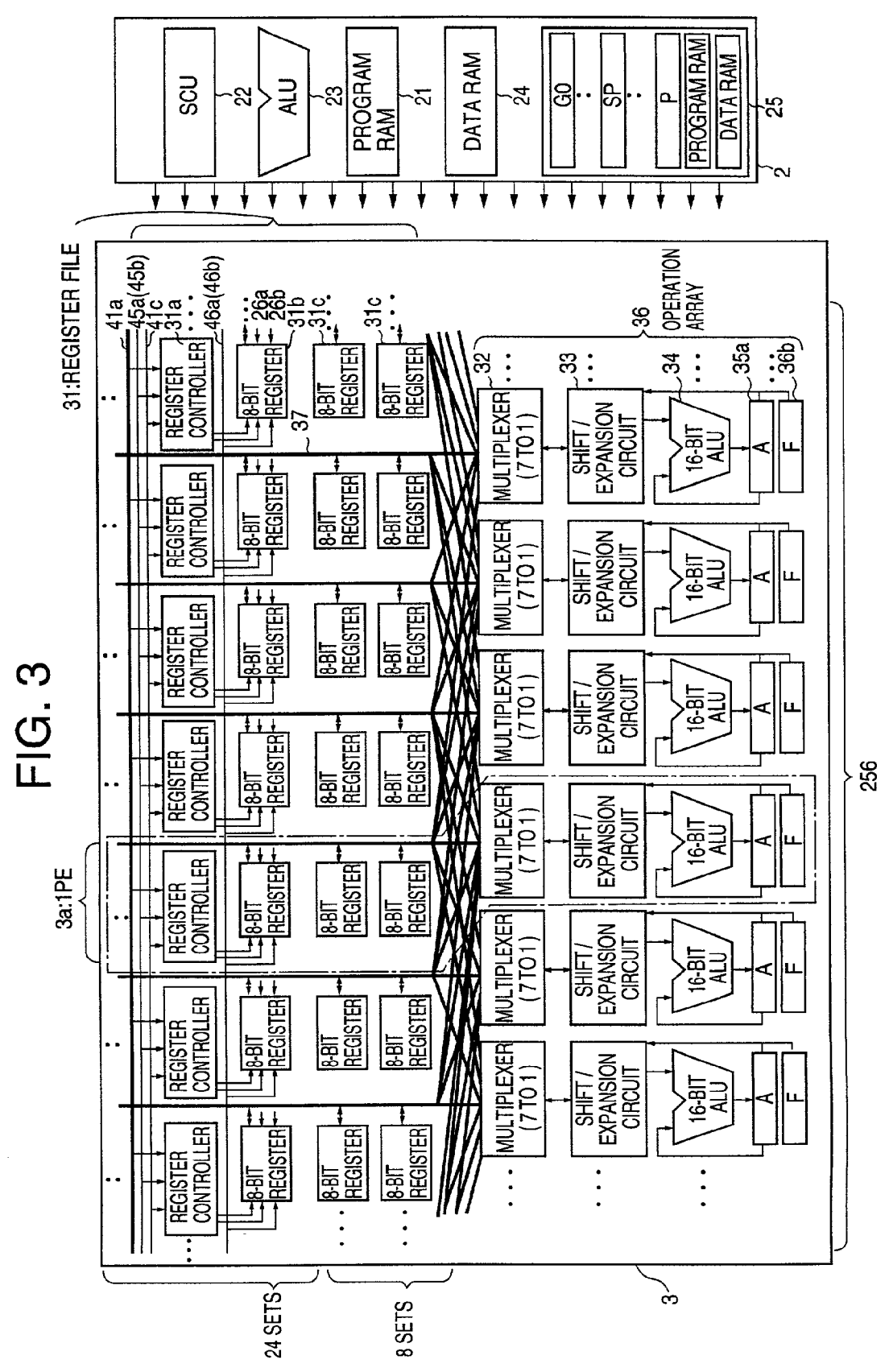

The processor-element block 3 includes, as shown in FIGS. 2 and 3, the plurality of processor elements 3a each including the register file 31, multiplexer 32, shift and expansion circuit 33, ALU 34, registers 35a, 35b and 35c, as one unit. The register file 31 of each processor element 3a has 32 8-bit registers built therein, and the sets of registers for 256 processor elements 3a form an array configuration.

External access to these registers is such that one register of each processor element can be accessed by one external port, and, the number (0 through 255) of processor element is specified by the address input externally. Total 24 external ports are mounted for the register access. Further, data to be accessed externally is, as described above, 16-bit data for a pair of even processor element 3a and odd processor element 3a, and, two registers are accessed simultaneously by a single access.

In the first embodiment, the number of processor elements 3a is 256. However, it is not necessary to be limited thereto, and this number may be changed appropriately. To the processor elements 3a, addresses of 0 through 255 are assigned by the SCU 22 of the global processor 2 in an order such that the number increases as the distance from the interface 4 increases in FIG. 3.

The register file 31 of each processor element 3a includes the register controllers 31a and two types of registers 31b and 31c. In the first embodiment, as shown in FIG. 3, each processor element 3a includes 24 sets each including the register controller 31a and register 31b, and 8 resisters 31c.

In the first embodiment, each of the registers 31b and 31c are of 8 bits. However, it is not necessary to be limited thereto, and the number of bits of each of the registers may be changed appropriately.

The two types of registers 31b and 31c of each register file 31 are registers, R0, R1, R2, . . . , R31 built in the register file 31. Each register file 31 has one read port and one write port for the operation array 36, and is accessed by the operation array 36 via a bus for both reading and writing of 8 bits. 24 registers of the 32 registers can be accessed from the outside of the processor 1, and reading from and writing to an arbitrarily one thereof can be made by inputting the clock, address and read/write control signals thereto.

Each register controller 31a is connected with the interface 4 via the above-mentioned address bus 41a, even read/write signal line 45a, odd read/write signal line 45b and clock signal line 41c.

When receiving the address control signal, the interface 4 sends the addressing signal to the processor-element block 3 via the address bus 41c. Thereby, a pair of processor elements 3a are specified at once by the address. Each register controller 31a decodes the sent addressing signal, and, when the address obtained from the decoding coincides with the address assigned to itself, inputs thereto the read/write instruction signal via the read/write signal line 45a or 45b in synchronization with the clock signal. Specifically, the register controller 31a assigned an even number inputs thereto the read/write instruction signal sent from the interface 4 via the even read/write signal line 45a, while the register controller 31a assigned an odd number inputs thereto the read/write instruction signal sent from the interface 4 via the odd read/write signal line 45b. At this time, the read/write instruction signals sent to the pair of processor elements 3a may be different from one another. That is, when the instruction signal sent to the register controller 31a assigned the odd number is the read signal, the instruction signal sent to the register controller 31a assigned the even number may be the write signal. The read/write instruction signal is given to the register 31b.

When the write signals are sent to both processor elements 3a, the register 31b of the processor element 3a assigned the even number receives data (8 bits) to undergo operation processing from the even data bus 46a and holds it, while the register 31b of the processor element 3a assigned the odd number receives data (8 bits) to undergo operation processing from the odd data bus 46b and holds it. On the other hand, when the read signals are sent to both processor elements 3a, the register controller 31a of the processor element 3a assigned the even number sends data (8 bits) having undergone operation processing to the even data bus 46a, while the register controller 31a of the processor element 3a assigned the odd number sends data (8 bits) having undergone operation processing to the odd data bus 46b.

Thus, by a single addressing operation, it is possible to transfer data to the processor element assigned the even number, and, also to transfer data to the processor element assigned the odd number. Thereby, it is possible to reduce the number of data transfer operations, and to perform data transfer at high speed.

Each register 31b holds data input externally to undergo the operation by the ALU 34 from then, or holds data having already undergone the operation by the ALU 34 then to be output externally. Accordingly, the register 31*b* can be used as a so-called input register and also as a so-called output register. Further, the register 31*b* has a function of the register 31*c* such as to temporarily hold data to undergo the operation processing or data having undergone the operation processing. Further, in the first embodiment, the register 31*b* is one which can hold 8-bit data. However, the capacity of the register may be changed appropriately according to the data. When a write instruction signal is given by the register controller 31*a*, the register 31*b* receives data to undergo the operation processing from the data bus 46*a* or 46*b* and holds it. On the other hand, when a read instruction signal is sent from the register controller 31*a*, the register 31*b* gives the held data having undergone the operation processing to the data bus 46*a* or 46*b*. This data is output externally from the interface 4 via the buffer memory not shown in the figure.

Further, the register 31*b* is connected to the multiplexer 32 via a data bus 37 which transfers 8-bit data in parallel. Data to undergo the operation processing by the ALU 34 or data having undergone the operation processing by the ALU 34 is transferred between the ALU 34 and register 31*b*. This transfer is performed via the read signal line 26*a* and write signal line 26*b* connected to the global processor 2, under control by the SCU 22 of the global processor 2. Specifically, when a read instruction signal is sent from the SCU 22 of the global processor 2 via the read signal line 26*a*, the register 31*b* places the held data on the data bus 37. This data is sent to the ALU 34, and undergoes the operation processing thereby. On the other hand, when a write instruction signal is sent from the SCU 22 of the global processor 2 via the write signal lien 26*b*, the register 31*b* holds data having undergone the operation processing by the ALU 34 and sent thereto via the data bus 37.

Each register 31*c* temporarily holds data given by the register 31*b* to undergo the operation processing or data having undergone the operation processing and then to be given to the register 31*b*. Different from the register 31*b*, no data transfer is performed between the register 31*c* and the outside.

The operation array 36 of each processor element 3*a* includes the multiplexer 32, shift and expansion circuit 33, 16-bit ALU 34, 16-bit A-register 35*a* and 16-bit F-register 35*b*.

Operation performed by each processor element 3*a* according to given instructions is such that, basically, data read from the register file 31 is input to one input terminal of the ALU 34, the contents of the A-register 35*a* are input to the other input terminal of the ALU 34, and the operation result thereof is stored in the A-register 35*a*. Accordingly, the operation is performed between the A-register 35*a* and registers R0 through R31 in the register file 31. The multiplexer of (7 to 1) is inserted between the register file 31 and operation array 36, and, selects from the processor elements 3*a* adjacent leftward by one, two and three processor elements 3*a*, adjacent rightward by one, two and three processor elements 3*a*, and the center processor element 3*a*, as a target processor element. Further, 8-bit data from the register file 31 is shifted leftward by an arbitrary number of bits by the shift and expansion circuit 33, and, then, is input to the ALU 34. Further, as shown in FIG. 2, by the 8-bit condition register (T) 35*c*, invalid/valid of operation execution is controlled for each processor element 3*a*, and, thereby, a specific one of the processor elements 3*a* can be selected.

Thus, the multiplexer 32 is connected to the data bus 37 provided in the processor element 3*a* to which this multiplexer 32 belongs, and, also, is connected to the data buses 37 of the three processor elements 3*a* adjacent leftward and the three processor elements 3*a* adjacent rightward. The multiplexer 32 selects one of these seven processor elements 3*a*, and sends data held by the registers 31*b* and 31*c* of the selected processor element 3*a* to the ALU 34. Further, the multiplexer 32 sends data having undergone the operation processing by the ALU 34 to the registers 31*b* and 31*c* of the thus-selected processor element 3*a*. Thereby, it is possible to render the operation processing using data held by the registers 31*b* and 31*c* of the adjacent processor element 3*a*, and to improve the capability of operation processing of the SIMD processor 1.

The shift and expansion circuit 33 shifts data sent from the multiplexer 32 by a predetermined number of bits, and sends the thus-processed data to the ALU 34. Further, the shift and expansion circuit 33 shifts data sent from the ALU 34 by a predetermined number of bits, and sends the thus-processed data to the multiplexer 32.

The ALU 34 renders arithmetic and logic operation based on data sent from the shift and expansion circuit 33 and data held by the A-register 35*a*. In the first embodiment, the ALU 34 deals with 16-bit data. However, this may be changed appropriately according to the data. The data having undergone the operation processing is held by the A-register 35*a*, and, is transferred to the shift and expansion circuit 33, or is transferred to general-purpose registers 25 of the global processor 2.

I/O-address, data and control signals are given to the interface 4 from the global processor 2 via buses. The global processor 2 sets commands of operation methods and so forth toward some operation setting registers (not shown in the figures) of the interface 4.

As described above, whether or not operation is to be performed in each processor element 3*a* is determined by using the execution condition flag. In the related art, setting/resetting of the execution condition flag is rendered by transferring data to the condition flags of all the processor elements, and, thereby, the same operation processing and so forth needs to be repeated. According to the present invention, it is possible to reduce the number of instruction execution cycles.

As shown in FIG. 2, in the first embodiment of the present invention, the processor-element (PE) number (i=0, 1, . . . , n) is transferred to all the processor elements 3*a* based on the control signal from the global processor 2. In order to transfer this PE number, the global processor 2 generates an LDPN (Load PE Number) instruction. As the PE number, based on the number previously set for each processor element 3*a*, 8-bit data is set by using a combination of GND/VCC voltages, for example. In this example, transistors of GND are turned ON/Off by the control signal based on the LDPN instruction, and, thereby, the PE signal is transferred to each processor element 3*a*.

The above-mentioned LDPN instruction sets the PE number in the A-register 35*a* of each of all the processor elements 3*a*. Thereby, '0' is set in the A-register 35*a* of the processor element PE0, and '127' is set in the A-register 35*a* of the processor element PE127, for example. These PE numbers are rendered as data expressed by binary notation. However, in the above-mentioned example, it is expressed by decimal notation, for the sake of easy understanding.

When the LDPN instruction is executed, the control signal is output to all the processor elements 3*a* from the SCU 22 of the global processor 2, and, for each processor element 3*a*, the PE number is set at one input terminal of the ALU 34, and the PE number is stored in the A-register 35*a* through the ALU 34.

As shown in FIG. 2, by the control signal given from the global processor 2, that is, the LDPN instruction, the PE number can be input to the A-register 35a of each processor element 3a. The PE number stored in each processor element 3a is used when the processor element is tested. For example, it is effective when PE shift is tested.

The PE shift is such that, using the multiplexer 32 of the operation array 36, assuming that the target processor element 3a is of PEn (n=0, 1, 2, 3, . . . , 255), data of the register of any specified one is selected from the registers of the processor elements of PEn+3, PEn+2, PEn+1, PEn, PEn−1, PEn−2 and PEn−3 to be input to the operation array 36 of the processor element of PEn, and, then, the operation result of this operation array 36 can be stored in registers of PEn+3, PEn+2, PEn+1, PEn, PEn-1, PEn-2 and PEn-3 from the A-register 35a or F-register 35b.

For example, the instruction is described as follows:
ADD R1:L3

'ADD' is an adding instruction, thereby, the value in the A-register of PEn and the value in the R1-register of PEn−3 are added to one another, and, the result of adding is stored in the A-register of PEn.

STA #12h, R1:U3

'STA' is a storing instruction, and, thereby, the value in the A-register of PEn is stored in the R1-register of PEn+3.

When the above-mentioned PE shift is rendered, in the related art, in an SIMD processor, only same data can be set in all processor elements. Accordingly, it is necessary to transfer data to the A-register for each PE, i.e., PE0, PE1, PE2, . . . , PE by PE, so as to set different values there. If the same value in all the processor elements results from rendering the PE shift, it is not possible to determine which PE the data has been transferred from. However, in the first embodiment of the present invention, by using the LDPN instruction, it is possible to set different PE numbers in the A-registers of the processor elements at once. By using the LDPN instruction, values of respective PE numbers are set in the A-registers 35a of all the processor elements 3a, for example. In this example, 0, 1, 2, 3, . . . are set in the A-registers in the ascending order of the processor elements. Then, data is stored in any register of the register file of each processor element by the PE shift. For example, when the PE shift of lowering by two is rendered and the data is stored in the register R1 of each processor element, 2, 3, 4, 5, . . . are then stored in the R0-registers in the ascending order of the processor elements. At last, when the A-register is compared with the R0-register in data stored therein, (value in A-register)−(value in R0-register)=2 is obtained in each processor element. A value other than 2 is obtained in a processor element in which the PE shift is not rendered properly.

The LDPN instruction may be used for operation specifying every n-th processor element 3a. For example, when every fifth processor element PE0, PE5, PE10, . . . is attempted to be selected, PE numbers are set in all the processor elements 3a by using the LDPN instruction. When the values of A-registers 35a of PE0, PE1, PE2, . . . , PE255 are set in order, these values are 0, 1, 2, . . . , 255. Then, the value of each A-register 35a is divided by 5 and the remainder thereof is stored (This operation can be rendered by repeating subtracting operation by the ALU, and the value finally remaining in the A-register 35a is the remainder. Thus, a removing method or a retracting method of dividing operation is employed therefor.). Thereby, the values become 0, 1, 2, 3, 4, 0, 1, 2, 3, 4, 0, 1, . . . , 0. Then, CMP instruction (comparison between the data in the A-register 35a and data in the register file 31 is made, and the result thereof is reflected in the specific bit of the T-register 35c) of the PE instruction is used. Thereby, it is possible to select the subsequent processor elements 3a of operation.

Thus, in the first embodiment of the present invention, regardless of the number of specified processor elements 3a, it is possible to complete selection of target processor elements through one cycle of LDPN instruction, 16 cycles of dividing operation and one cycle of CMP instruction.

As shown in FIG. 2, a GA bus 211 is used for data transfer from the global processor 2 to the processor elements 3a. The GA bus 211 is connected to a G0-register of the global processor 2, and data in the G0-register is transferred to the A-register 35a of specified processor elements 3a. Further, an AG bus 212 is connected to the A-register 35a of each processor element 3a, and, therethrough, data stored in the A-register 35a is transferred to the G0-register.

For data transfer from the global processor 2 to the A-register 35a, MGAA (Move G0 to A by Area Assignment) instruction and MGAB (Move G0 to A by Bit Assignment) instruction, for example, are used.

By the MGAA instruction, the value of the G0-register is transferred to the A-registers 35a of the processor elements PEi through PEj (i≦j; i, j=0, 1, . . . , 255). Addressing may be immediate addressing or register addressing, and, for example, is described as follows:

(MGAA #12, #23)

Thereby, the value of the G0-register is transferred to the A-registers 35a of the processor elements of PE12 through PE23.

(MGAA G2, G3)

Thereby, the value of the G0-register is transferred to the A-registers 35a of the processor elements of PE(G2) through PE(G3). When the value of a register G2 is 23 and the value of a register G3 is 45, the processor elements of PE23 through PE45 are directed to.

(MGAA G2+, G3)

Thereby, the value of the G0-register is transferred to the A-registers 35a of the processor elements of PE(G2) through PE(G3). After the transfer, the value of the register G2 is incremented by 1.

The MGAB instruction is used in a case where every n-th processor element 3a is selected. Addressing may be immediate addressing or register addressing, similarly to the case of the above-described MGAA instruction. The immediate addressing is, for the sake of easy recognition, described by bit specifying.

In the case of MGAB instruction, the bit specifying value for processor elements 3a is described in the first operand, and a mask value for processor elements 3a is described in the second operand.

The PE number satisfying the following formula is selected:

(the number of PE to be specified)&(mask value)= (bit specifying value)&(mask value)

For example, description is made as follows:
(MGAB #00000000b, #00000001b)

Thereby, the value of the G0-register is transferred to the A-registers 35a of the processor elements of PE0, PE2, PE4, . . . , PE2*i (i=0, 1, 2, . . . , 127).

(MGAB G2, G3)

Thereby, the value of the G2-register is the bit specifying value and the value of the G3-register is the mask value, and, then, the value of the G0-register is transferred to the A-registers 35*a* of processor elements having the PE numbers satisfying the above-mentioned formula.

(MGAB G2+, G3)

Thereby, the value of the G2-register is the bit specifying value and the value of the G3-register is the mask value, and, then, the value of the G0-register is transferred to the A-registers 35*a* of processor elements having the PE numbers satisfying the above-mentioned formula. After the transfer, the value of the G2-register is incremented by 1.

As described above, by connecting the A-registers 35*a* of all the processor elements 3*a* to the G0-register of the global processor 2 through the GA bus 211, it is possible to transfer the value of the G0-register to the A-registers 35*a* of arbitrary processor elements 3*a* through the MGAA instruction or MGAB instruction.

Figure 5:
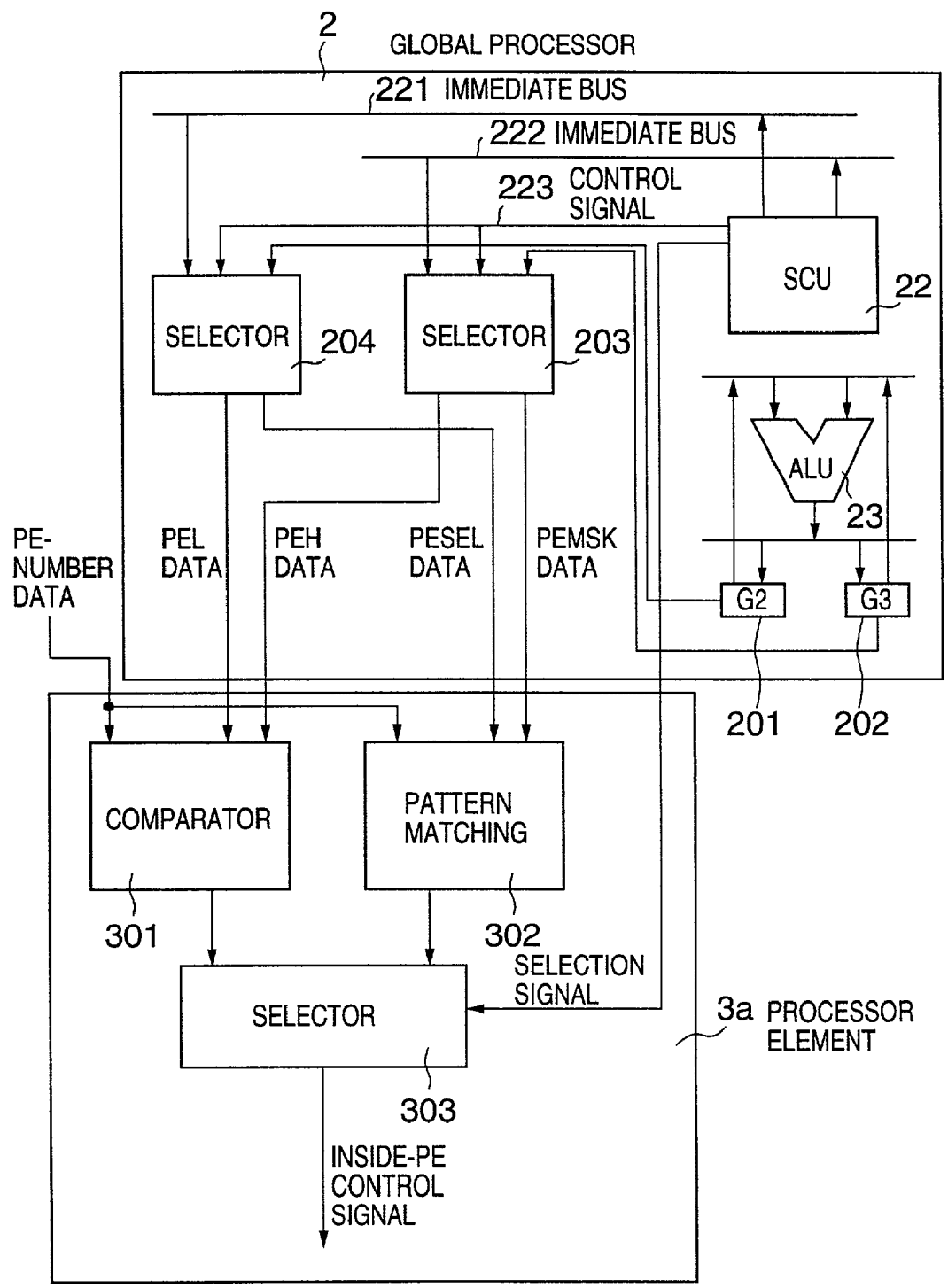
FIG. 5 is a block diagram showing another partial detailed configuration of the SIMD processor shown in FIG. 1.

The MGAA instruction or MGAB instruction may be used for determining whether or not the processor element 3*a* is a target of operation, through a comparator 301 and a pattern matching circuit 302 provided in each processor element 3*a*, as shown in FIG. 5.

The MGAA/MGAB instruction and control signal are output from the SCU 22 of the global processor 2, and immediate values are given to immediate buses 221 and 222. The immediate value given to the immediate bus 221 is given to a selector 204. From a selector 203, PEMSK data and PEH data are output to the processor element 3*a*. The PEMSK data is given to the pattern matching circuit 302 of the processor element 3*a*, and the PEH data is given to the comparator 301. From the selector 204, PESL data and PEL data are output to the processor element 3*a*. The PESL data is given to the pattern matching circuit 302 of the processor element 3*a*, and the PEL data is given to the comparator 301.

PE-number data is given to the comparator 301 and pattern matching circuit 302.

When a condition of each block is satisfied, a signal output therefrom, and, based on a selection signal from the global processor 2, a selector 303 determines whether the signal indicates range specifying or mask specifying, and outputs a signal selected according to the determination.

The PE-number data input to the comparator 301 and pattern matching circuit 302 is generated by connecting signal lines of 8 bits to VCC and GND in each processor element 3*a*. For example, in the processor element of PE6, the signal lines are connected to GND, GND, GND, GND, GND, GND, VCC, VCC and GND, respectively, in the descending order of bits. The connection is made by using switches provided for each bit, by a control signal output from the global processor 2. When the connection is made, the PE number can be input. As shown in FIG. 2, the PE number is also input to the input terminal of the ALU 34. The disconnection is made by the control signal from the global processor 2 in the same manner.

In response to the MGAA instruction, the PE number held by each processor element 3*a* is compared with the upper-limit value and lower-limit values specified by the immediate operands by the comparator 301. When the PE number falls within the range, the operation is executed in the processor element 3*a*. For execution/non-execution of operation, control is made such that the result of the ALU 34 is not updated in the A-register 35*a* (the latched signal is not updated). In the related art, data transfer for a certain range is rendered by setting the execution flag one by one for the range, and whether or not transfer is made is determined according to the execution condition flag. Accordingly, the number of cycles amounting to the number of transfer operations are needed. However, in the first embodiment of the present invention, by using the MGAA instruction, it is possible to specify the range of processor elements 3*a* through one cycle of processing.

Further, data transfer from the global processor 2 to the processor elements 3*a* can be performed by specifying every N-th processor element PE, such as every other processor element, every third processor element or the like, through the pattern matching circuit 302 provided in each processor element 3*a* shown in FIG. 5 performing bit mask specifying.

The PE numbers satisfying the following formula are selected:

(the number of PE to be specified)&(mask value)= (bit specifying value)&(mask value)

For example, when data transfer is made to the odd processor elements, i.e., the processor elements of PE1, PE3, PE5, PE7, . . . are selected, the bit specifying value is set to be 00000001b, and the mask value is set to be 11111110b. Thereby, all the PE numbers each having '1' at the LSB satisfy the above-mentioned formula, and thus are selected.

Further, when the bit specifying value is set to be 00001100b ('12' in decimal notation) and the mask value is set to be 00000010b, the processor elements satisfying the above-mentioned formula are of PE12 and PE14. Accordingly, it is possible to specify a range of even processor elements to be selected.

As shown in FIG. 5, the G2-register 201 and G3-register 202 of the global processor 2 are connected with all the processor elements 3*a* through buses. As a result of the selectors 203 and 204 selecting from immediate data from the SCU 22 and data from the G2 and G3-registers 201 and 202, addressing by using the G2 and G3-registers 201 and 202 can be rendered. Thereby, it is possible to store results of the operation according to instructions given by the global processor 2 into the G2 and G3-registers 201 and 202, and to render dynamic addressing by using the data.

Further, adding operation of the value of the G2-register 201 can be performed by the ALU 23 in the global processor 2. Accordingly, by providing incrementing operation in an operand, it is possible to add one after operation and to reduce the subsequent operation range.

Figure 4:
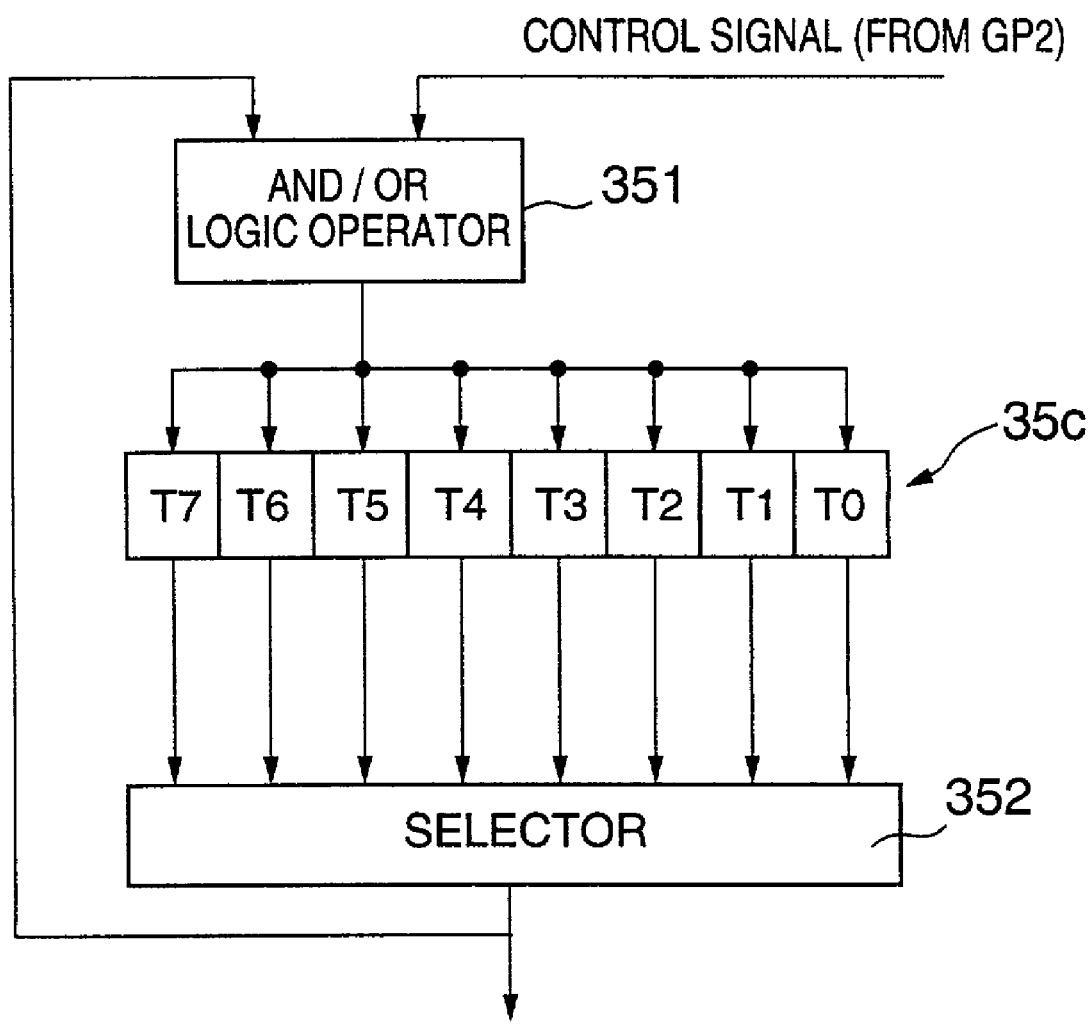
FIG. 4 is a block diagram showing a configuration of a T-register in each processor element shown in FIG. 3.

Further, in the first embodiment of the present invention, as shown in FIG. 2, the condition register (T-register) 35*c* for specifying the execution condition is provided in each processor element 3*a*. FIG. 4 shows a configuration of the T-register 35*c*.

As shown in FIG. 4, each processor element 3*a* includes the T-register 35*c* of 8 bits. By this register 35*c*, control is made bit by bit. Accordingly, it is possible to hold 8 types of control patterns in one processor element 3*a*. Thereby, all the processor elements 3*a* can hold 8×256 types of patterns. One bit of the T-register 35*c* performs control of valid/invalid of operation execution for each processor element 3*a*, and, it is possible to select specific processor elements 3*a* as targets of the operation. It is possible to change the value of the T-register 35*c* by the PE instruction from the global processor 2.

The T-register 35*c* has a configuration such that logical operation is performed on the control signal from the global processor 2 and the value of a specific bit of the T-register 35*c* through an AND/OR logical operator 351, and, the result thereof is stored in a specific bit thereof. The destination of the storing is determined by the control signal from the global processor 2. That is, as shown in FIG. 4, in the first embodiment of the present invention, the logical operator 351 performing AND/OR operation is provided on the input side of the T-register 35c, and the output of the T-register 35c is given to a selector 352. Then, by the selector 352, the value of the T-register 35c is fed back and is output.

An instruction of setting/resetting of a specific bit of the T-register 35c of an arbitrary processor element 3a may be a SETTA (Set T by Area Assignment) instruction or an SETTB (Set T by Bit Assignment) instruction. An instruction of transfer data to the T-register 35c may be an LDT (Load to T-register) instruction. The LDT instruction has an immediate value or a register value in an operand thereof, and, the global processor 2 transfers the least 8 bits of the value to the T-registers 35c of all the processor elements 3a via the signal line 210.

The SETTA instruction regards the processor elements 3a in a range specified by the operand as targets of the operation, and performs setting/resetting on the specific bit of the T-register 35c of each processor element 3a of the targets. A method of the specifying is, same as that in the MGAA, such that the value of the specific bit of each T-register 35c within the specified range is set to be "1", while "0" is set to each T-register 35c out of the range. Further, the SETTA instruction can specify operation using the value of T-register 35c obtained after execution of the precedent instruction. For example, description is made as follows:

SETTA/T2/A #12, #23

There, subsequent to the instruction, specifying of a specific bit ('/T2' indicating the second bit from the LSB), and specifying of a type of operation (as a result of '/A' being specified, an AND operation is performed, and, when '/O' is specified, an OR operation is performed) are described. Because the operation is specified, the result of AND of the value of the T2 bit of each processor element 3a of PE12 through PE23 and "1" is stored in the T2 bit.

The SETTB instruction is, same as the MGAB instruction, such that selection of processor elements 3a is performed by bit specifying and mask specifying through the operands thereof. Further, logical operation using the old value of a specific bit of the T-register by '/A' and '/O' rendered by the SETTA instruction described above can also be performed.

As mentioned above, the output from the T-register 35c is selected from by the selector 352, the previous value of the T-register 35c is fed back thereby, and logical operation is performed by the logical operator 351 using a new value. Thereby, not only setting/resetting of the T-register 35c, an AND/OR operation can be performed. Thereby, it is possible to specify irregular areas such as a plurality of skipped areas and so forth.

For example, when areas such as PE10 through PE15, PE26 through PE40, and PE100 through PE111 are to be specified, a specific flag of each of all the processor elements 3a is cleared by using the LDT instruction, SETTA instruction or the like, and, then, an OR operation (description of '/O') of the SETTA instruction is performed thrice. Thereby, the above-mentioned areas can be specified. The description therefor is as follows:

LDT #0

Thereby, "0" is transferred to all the bits of the T-registers of all the processor elements. Then,

SETTA/T1/O #10, #15
SETTA/T1/O #26, #40
SETTA/T1/O #100, #111

Figure 6:
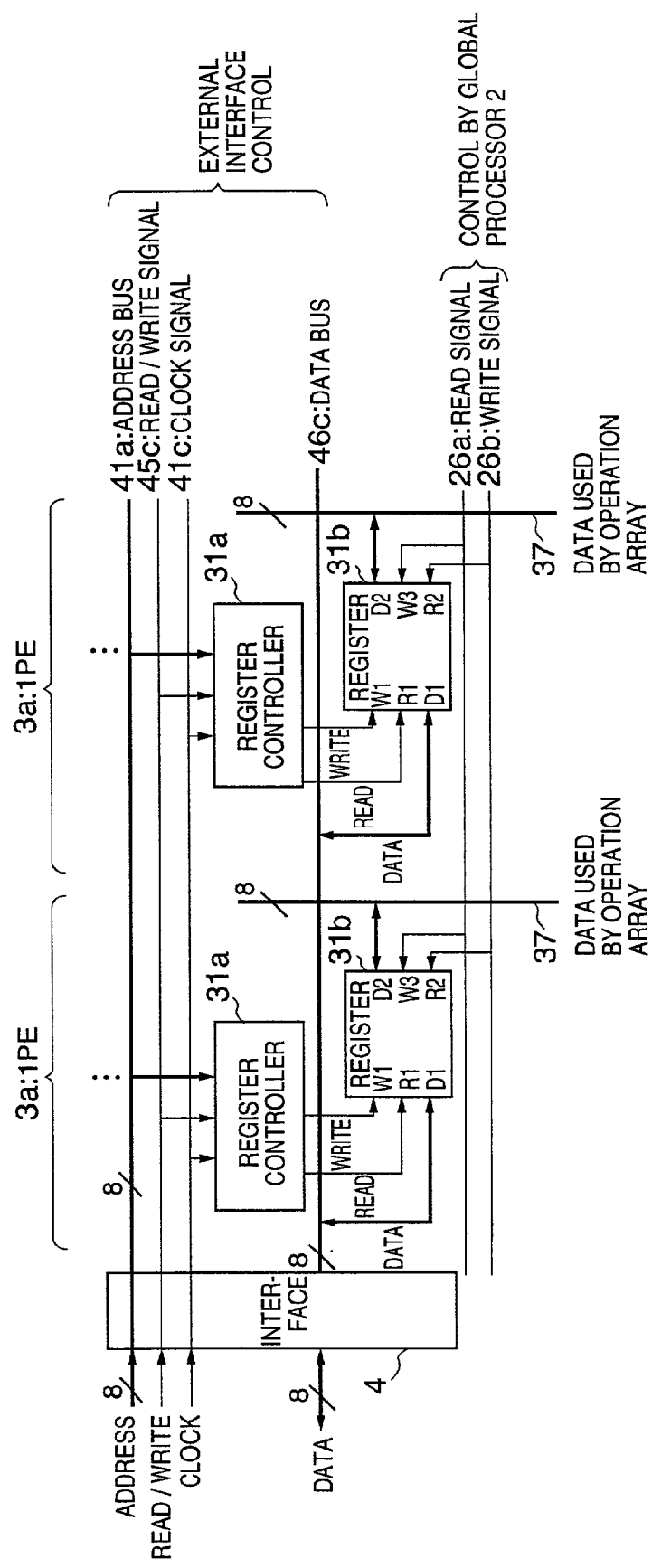
FIG. 6 is a block diagram showing a partial internal configuration of a first variant embodiment of the SIMD processor in the first embodiment of the present invention shown in FIG. 1.

In the first embodiment shown in FIG. 3, through single addressing, data can be transferred to the processor elements 3a assigned even numbers of the SIMD processor 1 from an external memory, and, also, data transfer can be made to the processor elements 3a assigned odd numbers. However, a method of inputting/outputting data to/from the SIMD processor 1 externally is not limited to this method. The present invention may also be applied to an SIMD processor 1 such that, for example, as shown in FIG. 6, without distinguishing the processor elements 3a of the SIMD processor 1 between those assigned even numbers and those assigned odd numbers, data is transferred in sequence by addressing. That is, as shown in FIG. 6 (showing a first variant embodiment of the above-described first embodiment), register controllers 31a are connected with the interface 4 via an address bus 41a, a read/write-signal line 45c, and a clock-signal line 41c. Each of the register controllers 31a, when receiving an addressing signal from the interface 4 via the address bus 41a, decodes the addressing signal. Then, when the address obtained from decoding coincides with the address assigned to itself, receives a read/write instruction signal via the read/write-signal line 45c in synchronization with a clock signal given via the clock-signal line 41c. The read/write signal is also given to a register 31b.

In this first variant embodiment of the first embodiment, image data from an image scanner provided outside of the SIMD processor 1 is placed on a data bus 46c as parallel data of 8 bits. This data bus 46c is also used for transmitting data having undergone the operation processing and held in the register 31b to a printer or the like provided outside of the SIMD processor 1.

Address, read/write, clock, data signals given by the interface 4 are provided to respective registers of each register file 31. Then, for each processor element 3a, the address signal is decoded, and only the processor element 3a in which the thus-obtained address coincides with the address for indicating a processor element 3a performs read/write operation.

The SIMD processor 1 having the above-described configuration is such that, when data from the outside is to be sent to a processor element 3a, the data is sent to the specified processor element 3a as a result of the address assigned thereto being specified only through once of inputting of the clock signal. In this variant embodiment, because data is not sent to the even and odd processor elements simultaneously, a larger time is required for data transfer in comparison to the case of the first embodiment. However, it is possible to simplify the circuit configuration.

Figure 7:
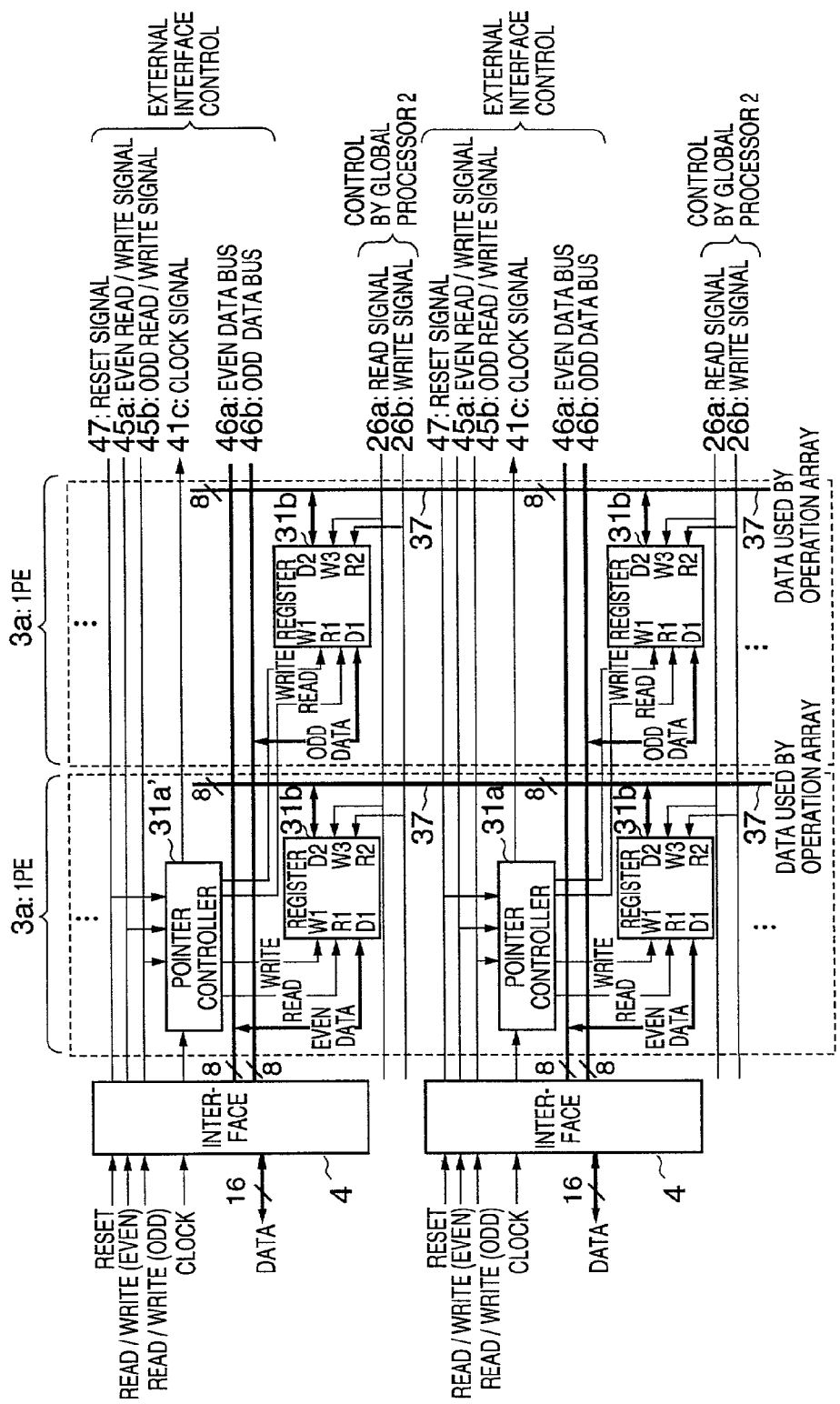
FIG. 7 is a block diagram showing a partial internal configuration of a second variant embodiment of the SIMD processor in the first embodiment of the present invention shown in FIG. 1.

In the first embodiment and the first variant embodiment thereof described above, the processor elements 3a are addressed. However, not only to a method of addressing for specifying the processor elements 3a but also to a method of pointer specifying, that is, a serial access memory method, the present invention may be applied. This example (a second variant embodiment of the first embodiment) will now be described with reference to FIG. 7. Here, the points different from the first embodiment described above will now be described, and the same points as those of the first embodiment are omitted from description. Further, for the same parts/components as those of the first embodiment, the same reference numerals are given.

From the global processor 2 to the interface 4, address data for I/O, and control signals are given via buses. The interface 4, based on a command of the global processor 2, generates a reset signal, and, sends the reset signal to the processor-element block 3 via a reset-signal line 47. Thereby, pointer controllers 31a are reset. Then, a clock signal is sent to the pointer controller 31*a*' nearest to the interface 4 via a clock-signal line 41*c*. In synchronization with the clock signal, the pointer controller 31*a*' receives read/write-instruction signals sent from the interface 4 each via a read/write-signal line 45*a* or 45*b*. The read/write-instruction signals are then given to a register 31*b* of the processor element 3*a* assigned an even number and to a register 31*b* of the processor element 3*a* assigned an odd number. At this time, read/write-instruction signals sent to the pointer controller 31*a*' of the pair of processor elements 3*a* may be different from one another, same as the case of the above-described first embodiment.

Thereby, same as the case of the above-described first embodiment, it is possible to transfer data to the processor element 3*a* to which an even number is assigned and also to the processor element 3*a* to which an odd number is assigned through once of specifying by pointer.

Further, it is possible to apply the present invention to a method, employing the above-described method of performing specifying by pointer, but in which, data is transferred to the processor element 3*a* to which one number is assigned, through once of specifying by pointer.

A second embodiment of the present invention will now be described with reference to FIG. 8.

Figure 8:
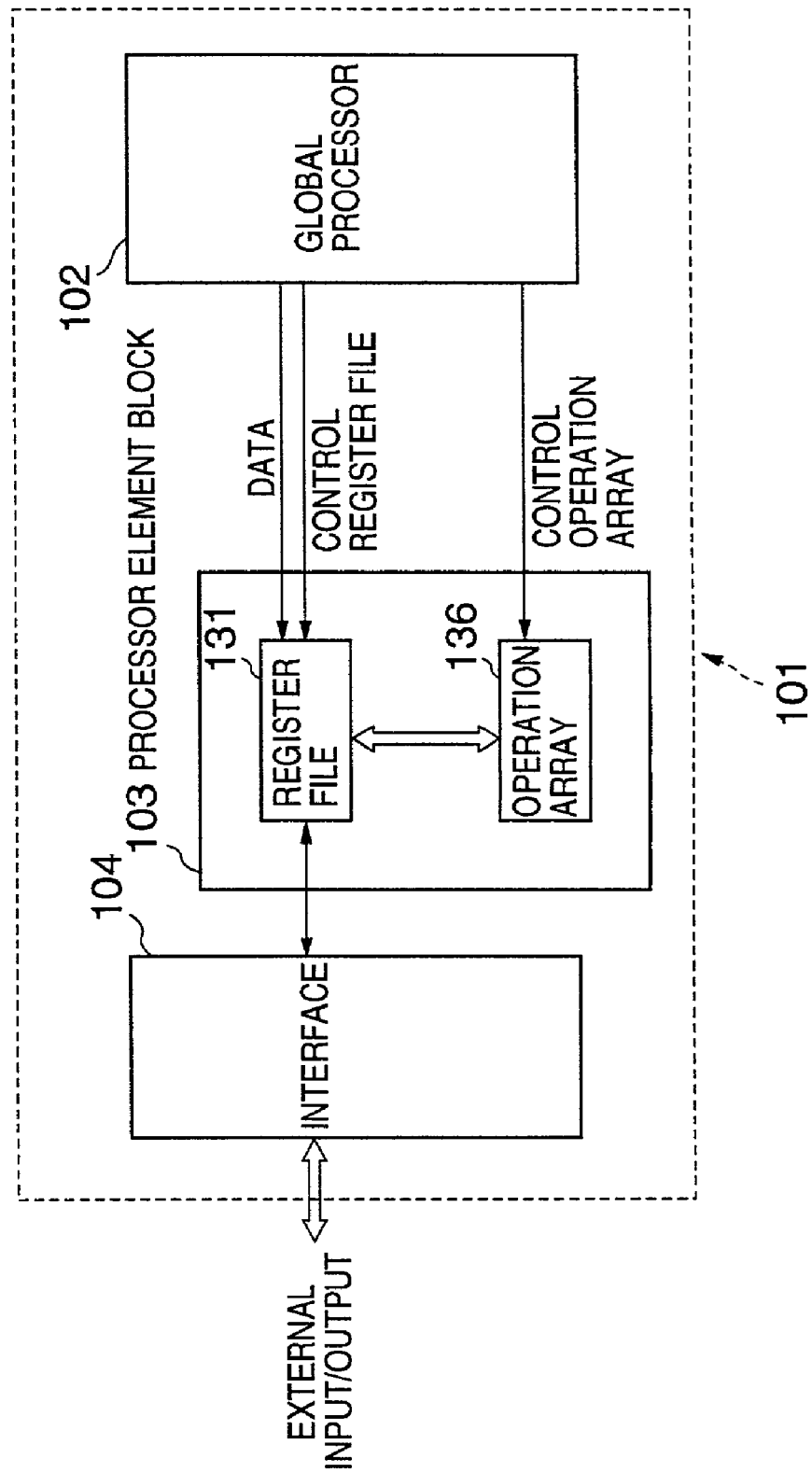
FIG. 8 is a block diagram showing the entire configuration of an SIMD processor in a second embodiment of the present invention.

FIG. 8 shows an entire configuration of an SIMD processor 101 in the second embodiment of the present invention.

As shown in FIG. 8, the SIMD processor 101 includes a global processor 102, a processor-element block 103 including 256 processor elements 103*a* and an interface 104. The interface 104, based on instructions from the global processor 102, gives data which is to undergo the operation processing to register files 131 for inputting/outputting of the processor elements 3*a* from an external inputting device such as an image scanner, and, also, transfers data having undergone the operation processing to an external outputting device such as a printer from the register files 131.

The external inputting/outputting device are those for inputting/outputting operation data such as digital image data. As external inputting devices, an image scanner, an image memory in which images are stored, and so forth may be used. As external outputting devices, a printer printing out image data, an image memory in which data is stored, and so forth may be used.

The global processor 102 is a processor of a so-called SISD (Single Instruction Stream Single Data Stream) type, has a program RAM and a data RAM built therein, interprets programs, and generates various control signals. The control signals are not only used for control of built-in various blocks, but also provided to the register files 131, operation arrays 136, and so forth. Further, at a time of execution of GP (Global Processor) instructions, the global processor 102 uses built-in general-purpose registers, ALU (arithmetic and logic unit), and so forth, and performs program control processing.

Each register file 131 holds data to be processed according to PE (Processor Element) instructions. The PE instructions are instructions in a type of SIMD (Single Instruction Stream Multiple Data Stream) for performing same processing on a plurality of sets of data held in the register files 131 simultaneously. Control of reading/writing of data from/to the register files 131 is rendered by the global processor 102. Data read out therefrom is sent to each operation array 136, and, after undergoing the operation processing performed by the operation array 136, is written to the respective register file 131.

Further, to the register files 131, access from the outside of the processor 101 can be made. Independently from control by the global processor 102, external reading/writing from/to specific registers may be performed.

Each operation array 136 renders the operation processing of PE instructions. All the control of the processing is performed from the global processor 102.

Figure 9:
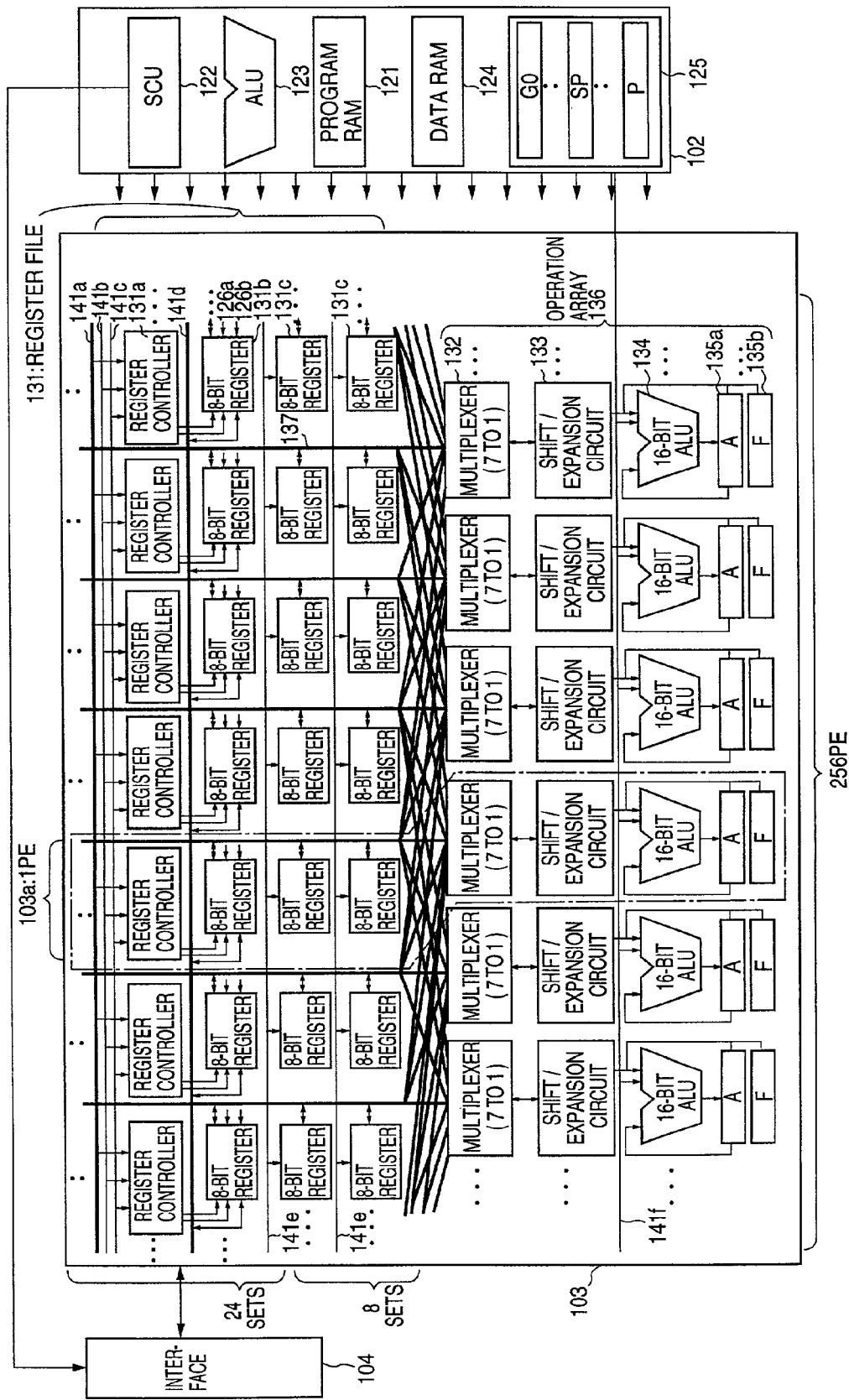
FIG. 9 is a block diagram showing a partial internal configuration of the SIMD processor shown in FIG. 8.

With reference to FIG. 9, one example of reading/writing of data from/to the register files 131 of the SIMD processor 101 will now be described.

The global processor 102 includes the program RAM 121 for storing programs thereof and the data RAM 124 for storing operation data, built therein. Further, a group 125 of registers such as a program counter (PC) holding addresses of the programs, G0 through G3-registers which are general-purpose registers for storing data for the operation processing, a stack pointer (SP) for holding an address of the data RAM at which data is saved at a time of register saving and returning, a link register (LS) for holding an address of source of call at a time of subroutine call, LI, LN registers for holding addresses of branch sources at a time of IRQ and NMI, a processor status register (P) holding states of the processor are built in the global processor 102. Further, in the global processor 102, an SCU (sequence unit) 122 is included which controls, based on the programs in the program RAM 121, the global processor 102, processor-element block 103 and interface 104.

The global processor 102 executes GP instructions by using the group 125 of registers, an instruction decoder (not shown in the figure), an arithmetic and logic unit 123 (referred to as 'ALU 123', hereinafter), a memory control circuit, an interrupt control circuit, external I/O control circuit and a GP operation control circuit (not shown in the figure).

Further, at a time of execution of PE instructions, the global processor 102 performs control of the register files 131 and control of the operation arrays 136 by using the instruction decoder, a register file control circuit and a PE operation control circuit (not shown in the figure).

In the second embodiment, as will be described, a configuration is made such that, according to instructions by the global processor 102, data can be transferred to a plurality of processor elements 103*a* from a table RAM.

As mentioned above, the SCU 122 controls the register files 131 and operation arrays 136 of the processor-element block 103.

Each operation array 136 includes a multiplexer 132, a shift and expansion circuit 133, an arithmetic and logic circuit 134 (referred to as 'ALU 134', hereinafter), and, an A-register 135*a* and an F-register 135*b*. Although not shown in FIG. 9, in the second embodiment, as will be described, a condition register and a condition selection register are included for performing comparison.

Further, the SCU 122 sends data and commands for operation setting for data transfer, to the interface 104. The interface 104, based on the data and commands for operation setting from the SCU 122, generates an address control signal for addressing of the processor elements 103*a*, read/write control signals for instructing read/write of data from/to registers 131*b* of the processor elements 103*a*, and a clock control signal for providing a clock signal.

A write control signal of the read/write control signals is a signal for causing the processor elements 103*a* to receive data to undergo the operation processing, from a data bus 141*d*, and have the registers 131*b* of the processor elements 103*a* hold the received data. A read control signal of the read/write control signals is a signal for instructing the registers 131*b* of the processor elements 103*a* to give data having undergone the operation processing and held by themselves to the data bus 141*b*.

The interface 104 receives the commands from the global processor 102, generates an addressing signal for addressing of the processor elements 103*a* of the processor-element block 103, and sends the signal to register controllers 131*a* of the processor elements 103*a* via an address bus 141*a*. Further, as will be described, the interface 104 gives a read/write instruction signal to the register controllers 131*a* of the processor elements 103*a* for instructing them to read/write data from/to the registers 131*b* via a read/write-signal line 141*b*.

Further, the interface 104 gives the clock signal to the register controllers 131*a* of the processor elements 103*a* via a clock-signal line 141*c*.

Further, from an external input/output bus, as mentioned above, data read in through an image scanner or the like provided outside of the SIMD processor 101 is given to the interface 104 as parallel data of 8 bits in the second embodiment. The 8-bit parallel data may be changed appropriately according to the type of data. The data bus 141*d* is also used when data having undergone the operation processing and held by the registers 131*b* is sent out to a printer or the like provided outside of the SIMD processor 101.

The group 125 of registers are connected with registers 135*a*, 135*b* of the processor-element block 103, and transmit/receive data to/from the registers 135*a* and 135*b* under control by the SCU 122.

The processor-element block 103 includes, as shown in FIG. 9, the plurality of processor elements 103*a* each including the register file 131, multiplexer 132, shift and expansion circuit 133, ALU 134, registers 135*a* and 135*b*. The register file 131 of each processor element (PE) 103*a* has 32 8-bit registers R0, R1, R2, . . . , R31 built therein, and the sets of registers for 256 processor elements 103*a* form an array configuration. Each register file 131 has one reading port and one writing port for the operation array 136, and is accessed by the operation array 136 through a bus for both reading and writing. 24 registers of these 32 registers can be accessed from the outside of the processor 101, and, by externally inputting address and read/write control signals, reading/writing of data from/to arbitrary ones thereof can be rendered.

External access to these registers is such that one register of each processor element can be accessed by one external port, and, the number (0 through 255) of processor element is specified by the address input externally. Accordingly, total 24 external ports are mounted for the register access.

In the second embodiment, the number of processor elements 103*a* is 256. However, it is not necessary to be limited thereto, and this number may be changed appropriately. To the processor elements 103*a*, addresses of 0 through 255 are assigned by the SCU 122 of the global processor 102 in an order such that the number increases as the distance from the interface 104 increases.

The register file 131 of each processor element 103*a* includes the register controllers 131*a* and two types of registers 131*b* and 131*c*. In the second embodiment, as shown in FIG. 9, each processor element 103*a* includes 24 sets each including the register controller 131*a* and register 31*b*, and, further, 8 resisters 131*c*. In the second embodiment, each of the registers 131*b* and 131*c* is of 8 bits. However, it is not necessary to be limited thereto, and the number of bits of each register may be changed appropriately.

Each register controller 131*a* is connected with the interface 104 via the above-mentioned address bus 141*a*, read/write-signal line 141*b* and clock-signal line 141*c*.

When receiving data transfer instructions from the global processor 102, the interface 104 sends the addressing signal to the processor-element block 103 via the address bus 141*a*. Thereby, the processor elements 103*a* are addressed. Each register controller 131*a* decodes the sent addressing signal, and, when the address obtained from the decoding coincides with the address assigned to itself, inputs thereto the read/write instruction signal sent via the read/write-signal line 141*b* in synchronization with the clock signal sent via the clock-signal line 141*c*. The read/write instruction signal is then given to the register 31*b*.

When the write instruction signal is sent to the register 131*b* from the register controller 131*a*, the register 131*b* receives data (8 bits) which is to undergo the operation processing, from the data bus 141*d* and holds it. When the read instruction signal is sent to the register 131*b* from the register controller 131*a*, the register 131*b* gives data (8 bits) having undergone the operation processing to the data bus 141*d*.

The register 131*b* holds data input externally to undergo the operation by the ALU 134, or holds data having already undergone the operation by the ALU 134 and to be then output externally. Accordingly, the register 131*b* can be used as a so-called input register and also as a so-called output register. Further, the register 131*b* has a function of the register 131*c* such as to temporarily hold data to undergo the operation processing or data having undergone the operation processing. Further, in the second embodiment, the register 131*b* is one which can hold 8-bit data. However, the capacity of the register may be changed appropriately according to data. As described above, when the write instruction signal is given by the register controller 131*a*, the register 131*b* receives data to undergo the operation processing from the data bus 141*d* and holds it. On the other hand, when the read instruction signal is sent from the register controller 131*a*, the register 131*b* gives the held data having undergone the operation processing to the data bus 141*d*. This data is output externally from the interface 104 to an external printer or the like via an external data bus.

Further, the register 131*b* is connected to the multiplexer 132 via a data bus 137 which transfers 8-bit data in parallel. Data to undergo the operation processing by the ALU 134 or data having undergone the operation processing by the ALU 134 is transferred between the ALU 134 and register 131*b* via the data bus 137. This transfer is performed via the read-signal line 126*a* and write-signal line 126*b* connected to the global processor 102, according to instructions by the SCU 122 of the global processor 102. Specifically, when the read instruction signal is sent from the SCU 122 of the global processor 102 via the read-signal line 126*a*, the register 131*b* places the held data to undergo the operation processing onto the data bus 137. This data is sent to the ALU 134, and undergoes the operation processing thereby. On the other hand, when the write instruction signal is sent from the SCU 122 of the global processor 102 via the write signal line 126*b*, the register 131*b* holds data, having undergone the operation processing by the ALU 134 and sent thereto via the data bus 137.

Each register 131*c* temporarily holds data given by the register 131*b* which is to undergo the operation processing, or data having undergone the operation processing which is to be then given to the register 131*b*. In the second embodiment, the register 131*c*, as will be described, has data from the global processor 102 given thereto.

The operation array 136 includes the multiplexer 132, shift and expansion circuit 133, 16-bit ALU 134, 16-bit A-register 135a and 16-bit F-register 135b.

Operation performed by each processor element 103a according to given instructions is such that, basically, data read from the register file 131 is input to one input terminal of the ALU 134, the contents of the A-register 135a are input to the other input terminal of the ALU 134, and the operation result thereby is stored in the A-register 35a. Accordingly, operation is performed between the A-register 135a and registers R0 through R31 in the register file 131. The multiplexer of (7 to 1) is inserted between the register file 131 and operation array 136, and, selects from the processor elements 103a adjacent leftward by one, two and three processor elements 103a, adjacent rightward by one, two and three processor elements 103a, and the center processor element 103a, as a target processor element. Further, 8-bit data from the register file 131 is shifted leftward by an arbitrary number of bits by the shift and expansion circuit 133, and, then, is input to the ALU 134.

Thus, the multiplexer 132 is connected to the data bus 137 provided in the processor element 103a to which this multiplexer 132 belongs, and, also, is connected to the data buses 137 of the three processor elements 103a adjacent leftward and three processor elements 103a adjacent rightward. The multiplexer 132 selects one of these seven processor elements 103a, and sends data held by the registers 131b and 131c of the selected processor element 103a to the ALU 134 of its own. Further, the multiplexer 132 sends data having undergone the operation processing by the ALU 134 to the registers 131b and 131c of the thus-selected processor element 103a. Thereby, it is possible to render the operation processing using data held by the registers 131b and 131c of an adjacent processor element 103a, and to improve a capability of operation processing of the SIMD processor 101.

The shift and expansion circuit 133 shifts data sent from the multiplexer 132 by a predetermined number of bits, and sends the thus-obtained data to the ALU 134. Further, the shift and expansion circuit 133 shifts data having undergone the operation processing and sent from the ALU 134 by a predetermined number of bits, and sends the thus-obtained data to the multiplexer 132.

The ALU 134 renders arithmetic and logic operation based on data sent from the shift and expansion circuit 133 and data held by the A-register 135a or F-register 135b. In the second embodiment, the ALU 134 deals with 16-bit data. However, this may be changed appropriately according to data. The data having undergone the operation processing by the ALU 134 is held by the A-register 135a, and, is transferred to the shift and expansion circuit 133, or is transferred to the general-purpose registers 125 of the global processor 102.

Addresses for I/O, data and control signals are given to the interface 104 from the global processor 102 via buses.

Further, by the condition register (T) not shown in the figure, execution of operation is controlled for each processor element 103a, and, thereby, it is possible to select specific processor elements (PE) 103a as targets of the operation.

As described above, in the second embodiment, the 32 8-bit registers are built in, in each processor element 103a, in the register file 131, and these registers for the 256 PEs form the array configuration. The registers are called R0, R1, R2, . . . , R31 for each PE. Each register has the single reading port and single writing port for the operation array 136, and is accessed by the operation array 136 via the 8-bit bus 137 for both reading and writing. The 24 registers 131b (R0 through R23) out of the 32 registers can be accessed from the outside of the processor 101, and, it is possible to read/write data to/from arbitrary ones thereof by inputting clock, address and read/write control signals externally.

The remaining 8 registers 131c (R24 through R31) are used for temporarily storing operation data of PE operation. However, it is also possible to write data from the data RAM 124 of the global processor 102 to these registers. A configuration is made such that it is possible to write data of the data RAM 124 of the global processor 102 to the 8 registers 131c built in each register file 131 of the plurality of processor elements 103a which satisfy the condition simultaneously, according to write control from the global processor 102 and the condition in the condition register of the operation array 136. Further, in the second embodiment, because the table RAM has an output port of 64 bits, it is possible to write 64 bits to 8 registers 131c for one PE 103a simultaneously.

As described above, the operation array 136 has the 16-bit ALU 134 and 16-bit A-register 135a and F-register 135b built therein. The operation according to PE instructions is such that, data read out from the register file 131 or data given by the global processor 102 is input to one input terminal of the ALU 134 and the contents in the A-register 135a are input to the other input terminal thereof. Then, the operation result of the ALU 134 is stored in the A-register 135a. Accordingly, the operation is performed on the data from the A-register 135a and the data given by the R0 through R31-registers 131b, 131c or global processor 102.

A manner of writing to the plurality of PEs 103a satisfying the condition the data of the table RAM simultaneously according to instructions by the global processor 102 will now be described with reference to FIG. 10.

To each register 131c of the register file 131, data in the table RAM 126 is input via a register-file control circuit 127 of the global processor 102. The table RAM 126 is used as a data memory for non-linear conversion processing. Writing to the register 131c from the table RAM 126 is rendered according to a write control signal of the register-file control circuit 127. A write control circuit 131d is provided in the register 131c. To the write control circuit 131d, the write control signal is given via a table write signal line 141g. Further, to the write control circuit 131d, a condition satisfaction signal is given from the operation array 136. The write control circuit 131d gives the write control signal to a write terminal W1 of the register 131c.

The write control circuit 131d performing write control for each register 131c provides the write control signal to the write terminal W1 of the register 131c only for the processor element 103a for which the condition satisfaction signal given by the operation array 136 indicates satisfaction. Accordingly, although, from the register-file control circuit 127, data from the table RAM 126 is sent to the registers 131c of all the PEs 103a, the data is written to the registers 131c of the PEs 103a satisfying the condition, through a data terminal D1, but is not written to those of the PEs 103a not satisfying the condition.

Data transfer is performed by the register 131c also with the operation array 136 via the data bus 137. Accordingly, the register 131c has another output port, and, data transfer is rendered through a data terminal D2 according to a read control signal given thereto through a read terminal R2 via a read-signal line 141h from the global processor 102 which generates the signal in response to given instructions.

Figure 10:
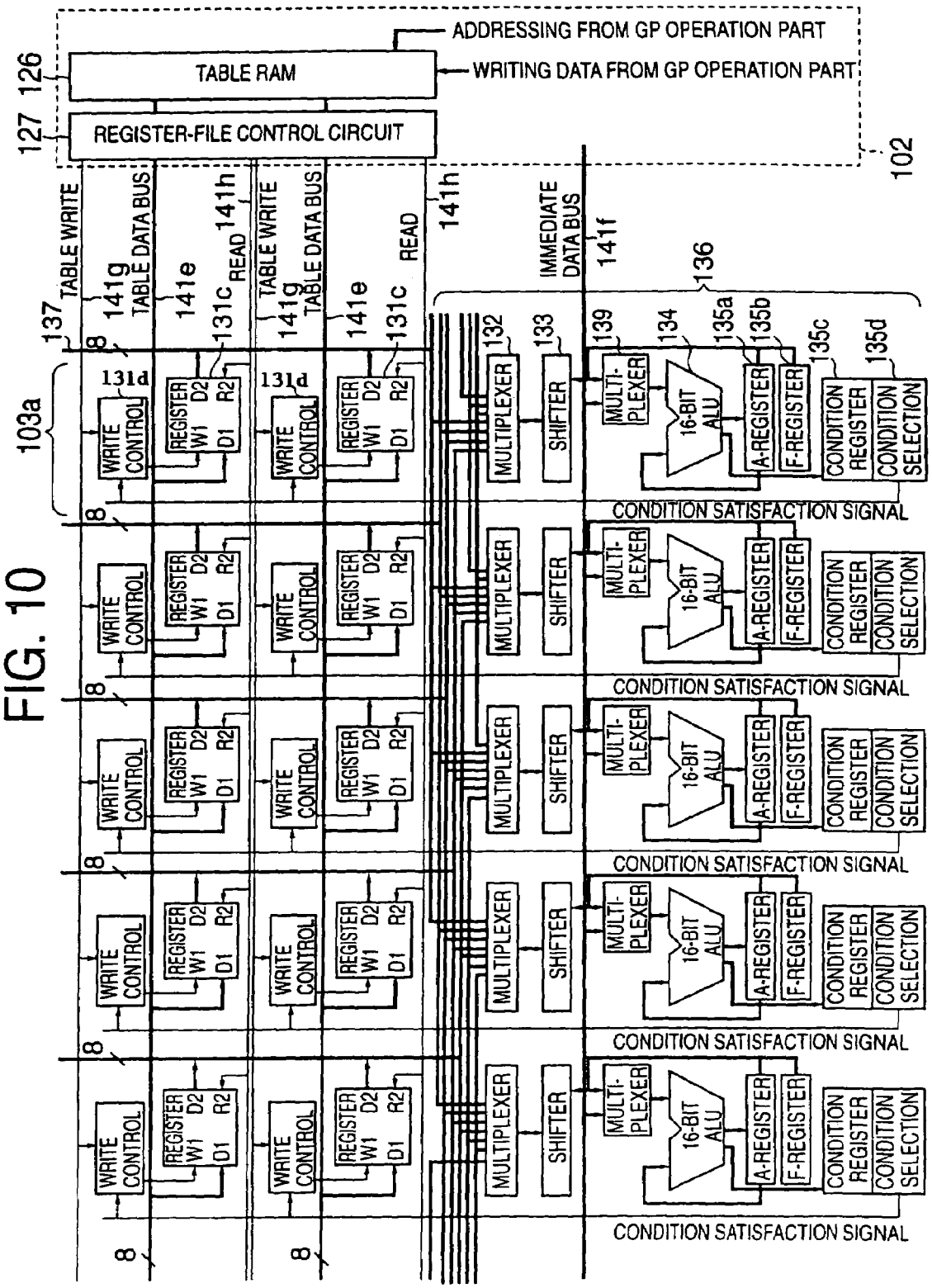
FIG. 10 is a block diagram showing another partial internal configuration of the SIMD processor shown in FIG. 8.

FIG. 10 shows a configuration for the only five PEs 103a. For a configuration for the 256 PEs 103a shown in FIG. 9, 256 sets each including the write control circuits 131d and registers 131c are needed. Further, although the bit width of data is 8 bits in the configuration of FIG. 10, it may vary according to the operation bit width to be dealt with.

Further, addressing of the table RAM 126 is rendered by using the general-purpose registers (G0 through G3) of the global processor 102 not shown in the figure, as a pointer of an address, and, similarly, the values in the table RAM 126 are set as a result of data of the general-purpose registers (G0 through G3) being written thereto.

The blocks described with reference to FIG. 9 are built in the operation array 136, and a configuration is made such that selection from the contents of the registers (R0 through R31) and the contents of an immediate data bus 141f may be made and a selected one is to be input to the input terminal of the ALU 134. Via the immediate data bus 141f, data is transferred from the global processor 102, and, selection is made from the value (immediate value) incorporated in the thus-given instruction code or the value of the general-purpose registers (G0 through G3), according to instructions.

Table conversion for non-linear processing is rendered through the following steps in the second embodiment shown in FIG. 10. Description will be made assuming that operation target data is stored in the register R0 of the registers 131b of the register file 131 (not shown in FIG. 10).

① The operation target data (to undergo the operation processing) stored in the register (R0) of the register file 131 not shown in the figure is loaded in the A-register 135a through the path of the multiplexer 132, shifter 133, a multiplexer 139 and the ALU 134 via the data bus 137.

② The global processor 102 inputs data to be converted, to the ALU 134 via the immediate data bus 141f. To the other input terminal of the ALU 134, the data stored in the A-register 135a in ① is input. Then, the ALU 134 performs coincidence operation. The coincidence result is stored in an arbitrary bit of the condition register 135c of 8 bits as condition satisfaction when the result is coincidence.

③ The global processor 102 outputs the address at which the data after conversion corresponding to the data to be converted is stored, to the table RAM 126, and gives the data after conversion for the registers 131c of the register files 131 of all the PEs 103a to a table data bus 141e. In the operation array 136, the arbitrary bit selected in ② of the condition register 135c is selected by the condition selection circuit 135d, and is output to the write control circuits 131d of the register file 131. In each register 131c, the write control circuit 131d receives the write signal and condition satisfaction signal, and, writes the contents on the table data bus 141e (data after conversion) to the register 131c only for the PE 103a for which the condition satisfaction signal indicates the condition satisfaction.

④ The global processor 102 prepares subsequent data to be converted, and repeats the steps ② through ③. The table conversion is completed through repetition of the above-mentioned processing the predetermined number of times according to the type of the data to be converted. In this example, only one piece of table data after conversion is used. However, actually, high-speed processing is rendered by the following processing:

① The data to undergo the operation processing stored in the register (R0) of the register file 131 not shown in the figure is loaded into the A-register 135a through the path of multiplexer 132, shifter 133, multiplexer 139 and ALU 134 via the data bus 137 of each processor element 103a.

② The global processor 102 inputs the data to be converted, to the ALU 134 via the immediate data bus 141f.

To the other input terminal of the ALU 134, the data of the A-register 135a stored in the step ① is input. The ALU 134 performs value comparison operation processing thereon. The comparison result is stored in an arbitrary bit of the condition register 135c of 8 bits as condition satisfaction when the data to undergo the operation processing is larger.

Figure 11:
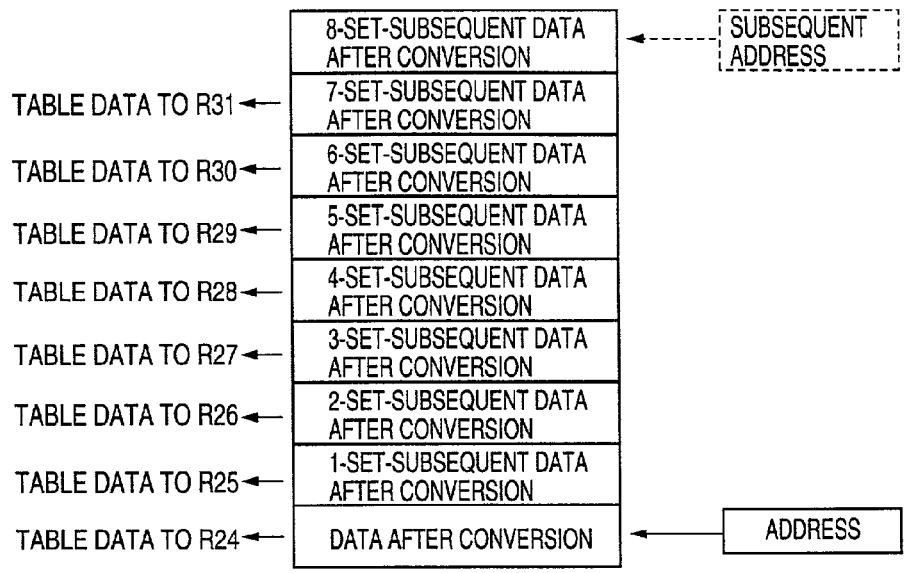
FIG. 11 illustrates transfer of data after conversion in the second embodiment shown in FIG. 8.

③ The global processor 102 outputs the address at which the data after conversion corresponding to the data to be converted is stored, to the table RAM 126, and gives the data after conversion for the registers 131c of the register files 131 of all the PEs 103a to the table data bus 141e. At this time, in the second embodiment, as shown in FIG. 11, the data after conversion is output to 8 table data buses 141e as each 8 bits of data after conversion corresponding to successive 8 sets of data to be converted. In the second embodiment, the 8 bits of data after conversion are prepared for the registers (R24 through R31) of each 8 bits, respectively. In the operation array 136, the arbitrary bit selected in ② of the condition register 135c is selected by the condition selection circuit 135d, and is output to the write control circuits 131d of the register file 131. In each register 131c, the write control circuit 131d receives the write signal and condition satisfaction signal, and, writes the contents (8 bits of data after conversion) on the table data buses 141e, to the register 131c only for the PE 103a for which the condition satisfaction signal indicates the condition satisfaction. At this time, each 8 bits of 8 sets of data after conversion are written to the registers R24 through R31 of the registers 131c simultaneously.

④ The global processor 102 adds 8 to the data to be converted, and prepares 8-set-advanced data to be converted, and repeats the steps ② through ③.

⑤ In order to leave the least significant 3 bits of the data to undergo the operation processing in the A-register 135a and mask the most significant 5 bits, operation of AND of the contents of the A-register 135a and the immediate value 7 is performed by the ALU 134, and the result thereof is stored in the A-register 135a.

⑥ The value of the A-register 135a is compared by the ALU 134 with 1 through 7 in sequence. The coincidence results are stored in the condition register 135c from T1 through T7 in sequence.

⑦ The value in the register (R24) is loaded into the A-register 135a. Then, for the PE 103a for which T1 of the condition register indicates the condition satisfaction, the value in the register (R25) is loaded into the A-register 135a; for the PE 103a for which T2 of the condition register indicates the condition satisfaction, the value in the register (R26) is loaded into the A-register 135a; . . . ; and, for the PE 103a for which T7 of the condition register indicates the condition satisfaction, the value in the register (R31) is loaded into the A-register 135a.

Through these steps, by writing 8 sets of data after conversion simultaneously, it is possible to increase the processing speed 8 times. In order to select one set of data needed for each processor element 103a from the 8 sets of data after conversion, the steps ⑤ through ⑦ are needed. This processing is needed only once after completion of repetition of the processing of ② and ③. Thus, a little overhead is needed. At this time, the overhead is expressed as α, the table conversion is rendered through the number of times amounting to ⅛ of the number of types of data to be converted +α. Accordingly, it is possible to render high-speed processing.

In this example, 8 sets of data after conversion are processed at once. However, it is possible to specify an arbitrary number of sets of 2, 4 and 8 by instructions. In this case, the value added in the step ④ is 2, 4 or 8, the mask value in the step ⑤ is 1, 3 or 7, and the comparison in the step ⑥ is 1, 1 through 3 or 1 through 7, and loading in the step ⑦ is R24 through R25, R24 through R27 or R24 through R31, respectively.

A method of reducing the number of registers used for the table conversion will now be described. In order to reduce the number of registers, processing is made in the following steps:

① The operation target data (to undergo the operation processing) stored in the register (R0) of the register file 131 not shown in the figure is loaded in the A-register 135a through the path of the multiplexer 132, shifter 133, a multiplexer 139 and the ALU 134 via the data bus 137.

② The global processor 102 inputs data to be converted, to the ALU 134 via the immediate data bus 141f. To the other input terminal of the ALU 134, the data stored in the A-register 135a in ① is input. Then, the ALU 134 performs value comparison operation processing thereon. The comparison result is stored in an arbitrary bit of the condition register 135c of 8 bits as condition satisfaction when the data to undergo the operation processing is larger. Further, for the PE 103a for which the condition is satisfied, the value obtained from subtracting the data to be converted from the data in the A-register 135a is temporarily stored in the register (R1) as differential data from the data to be converted.

Figure 12:
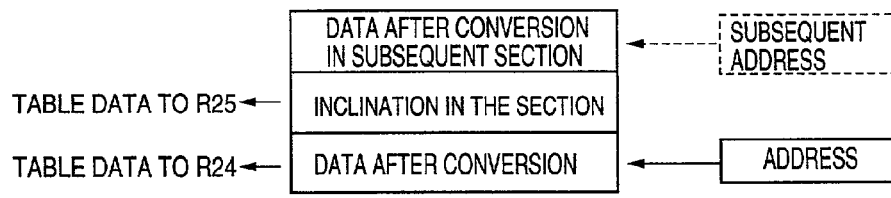
FIG. 12 illustrates transfer of data after conversion in a variant embodiment of the second embodiment shown in FIG. 8.

③ The global processor 102 outputs the address at which the data after conversion corresponding to the data to be converted is stored, to the table RAM 126, and gives the data after conversion for the registers 131c of the register files 131 of all the PEs 103a to the table data bus 141e. At this time, as shown in FIG. 12, the data after conversion corresponding to the data to be converted, and 8 bits of data of inclination up to the top data to be converted of a subsequent section used in a step ④ are output to the two table data buses 141e, as the data after conversion, and prepared for the registers (R24, R25) of each 8 bits, respectively. In the operation array 136, the arbitrary bit selected in ② of the condition register 135c is selected by the condition selection circuit 135d, and is output to the write control circuits 131d of the register file 131. In each register 131c, the write control circuit 131d receives the write signal and condition satisfaction signal, and, writes the contents on the table data bus 141e (data after conversion) to the register 131c only for the PE 103a for which the condition satisfaction signal indicates the condition satisfaction. At this time, writing is performed to the two registers (R24, R25) simultaneously.

④ The global processor 102 prepares the top data to be converted of the subsequent section, and repeats the steps ② through ③.

⑤ The differential data temporarily saved in the register (R1) is loaded into the A-register 135a, and operation of multiplication of the loaded data and the inclination data (R25) is performed by the ALU 134, and the result is stored in the A-register 135a.

⑥ The data after conversion (R24) is added to the data in the A-register 135a.

Figure 13:
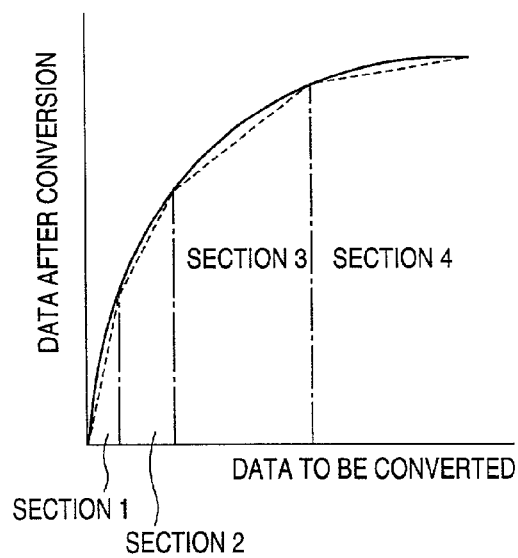
FIG. 13 shows a state of processing non-linear processing by dividing into sections according to the variant embodiment of the second embodiment of the present invention.

In the above-described method, as shown in FIG. 13, data to be converted is divided into arbitrary sections, and for each section, a common linear formula is applied, thus, processing is performed according to such approximation. That is, as shown in FIG. 13, from the non-linear relationship between the data to be converted and data after conversion, the sections are obtained from the division, each of which can be expressed by a linear formula (inclination). In the non-linear processing shown in FIG. 13, the four sections are obtained through the division. For each section, a common linear formula is applied. When the data to be converted falls within the section 1, the data after conversion is calculated by using the top data after conversion of the section 1 and the inclination data thereof. Similarly, when the data to be converted falls within the section 2, the data after conversion is calculated by using the top data after conversion of the section 2 and the inclination data thereof. Thus, for each section, approximate non-linear processing is performed using the top data after conversion and inclination data of the section. By employing such a process for each section, two registers are needed to be used, and, thus, it is possible to reduce the number of registers. Further, when it is possible to set the number of sections to be small, it is possible to reduce the conversion tables, and the number of processing steps.

Figure 14:
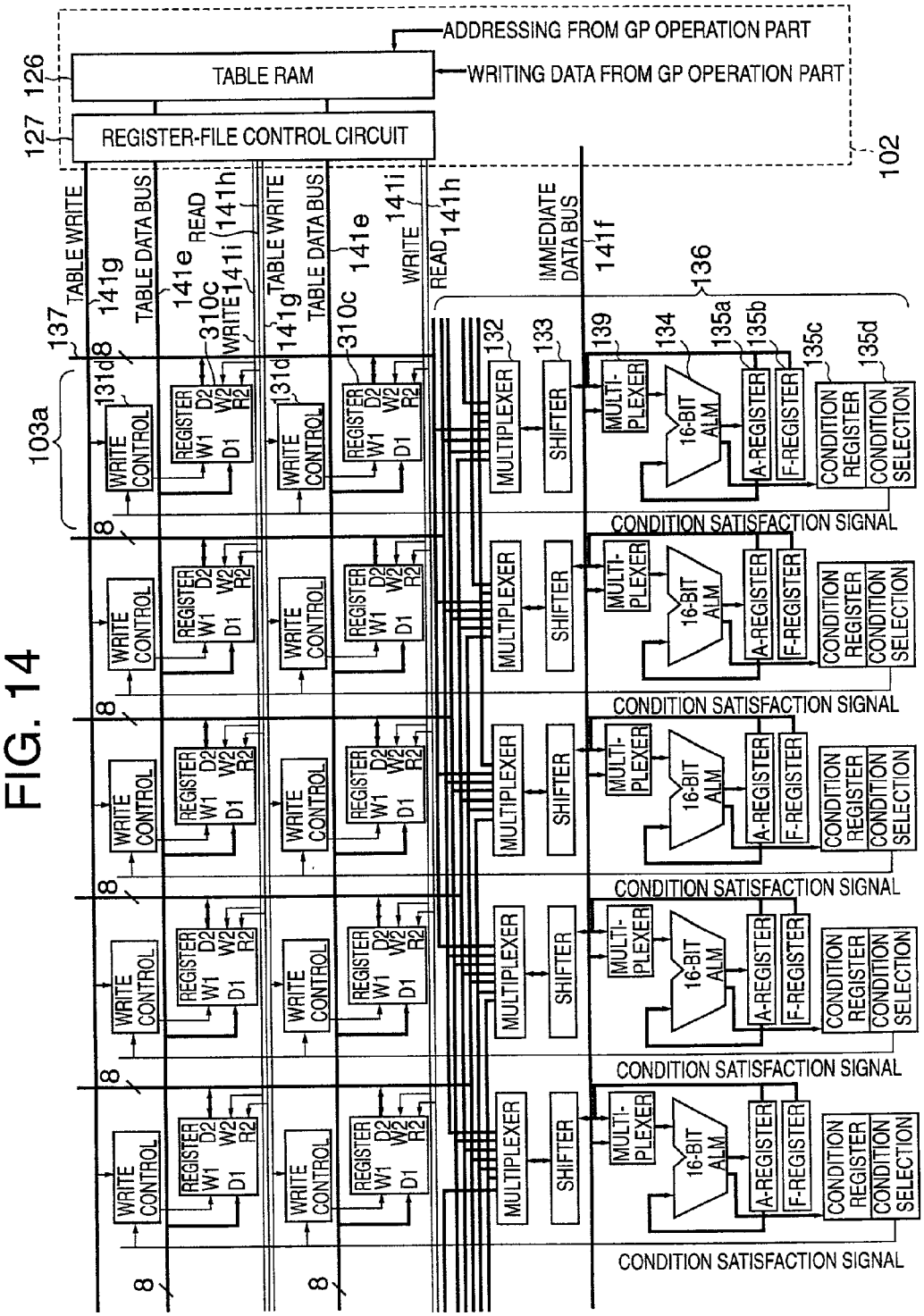
FIG. 14 is a block diagram showing a partial internal configuration of another, first variant embodiment of second embodiment shown in FIG. 8.

A first variant embodiment of the second embodiment will now be described with reference to FIG. 14. In the first variant embodiment of the second embodiment, the configuration of the 8 registers (R24 through R31) of the register file 131 used for the table conversion is changed from that of the second embodiment. The registers 131c shown in FIG. 10 are changed into registers 310c each additionally including a write-signal terminal (W2). Further, a configuration is made such that, through the data terminal (D2) of each register 310c, data can be input/output to/from the data bus 137. To the write-signal terminal W2, a write signal is given by the register-file control circuit 127 via the write-signal line 141i when the operation array 136 is to write data thereto. Thereby, a configuration is made such that data from the operation array 136 can be written to the register 310c.

In this configuration, it is possible for each register 310c to hold the operation result and so forth, and, the register 310c can be used as a normal register for operation when the table conversion is not rendered. When the table conversion is rendered, in order to render the processing described above with reference FIG. 11, or the processing described above with reference FIG. 12, the register 310c is used.

Figure 15:
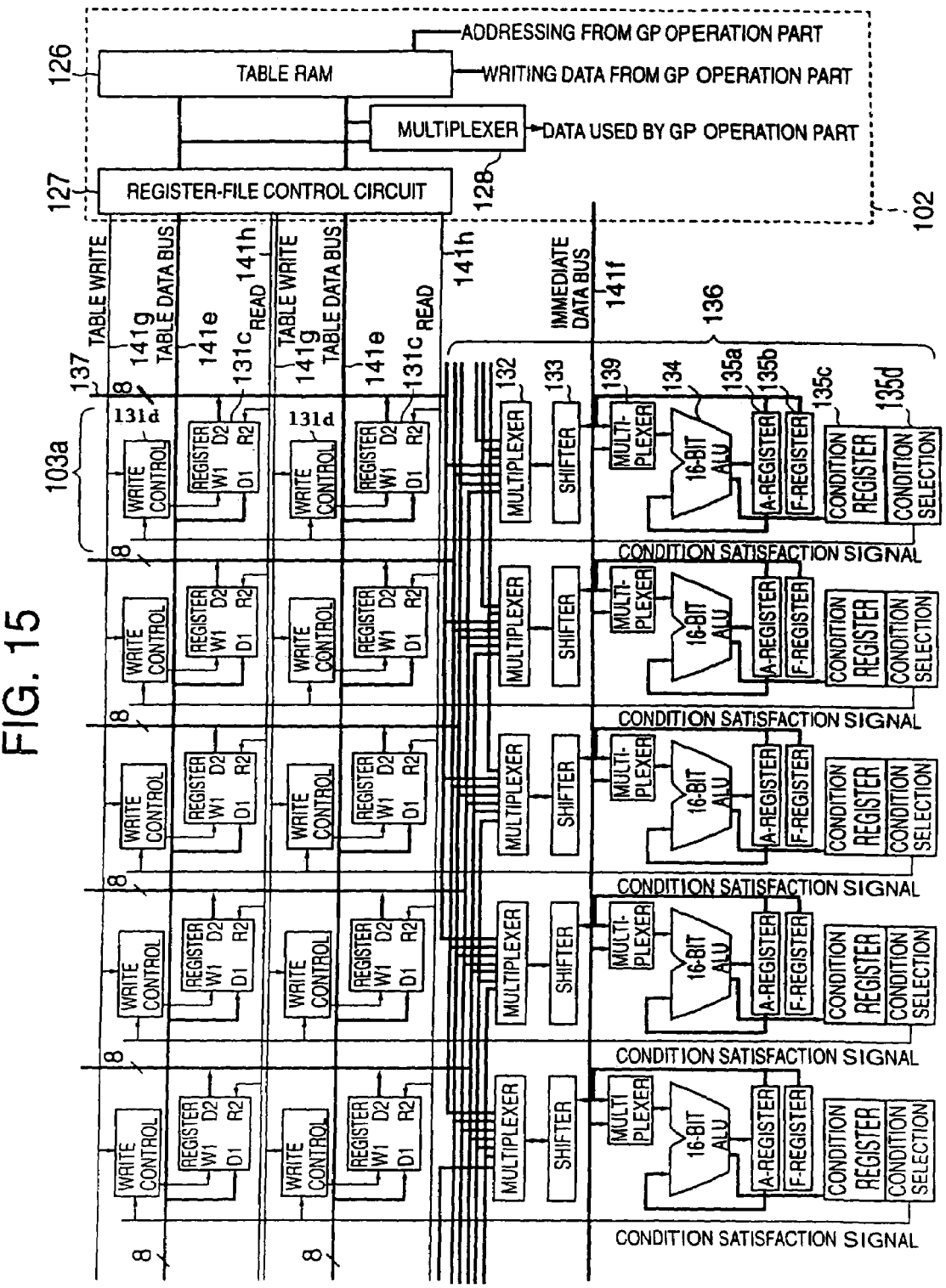
FIG. 15 is a block diagram showing a partial internal configuration of a second variant embodiment of the second embodiment shown in FIG. 8.

A second variant embodiment of the second embodiment will now be described with reference FIG. 15. The basic configuration thereof is the same as that of the second embodiment shown in FIG. 10, the same reference numerals are given to the same parts/components, and the duplicated description thereof is omitted.

In the second variant embodiment of the second embodiment, the output data of the table RAM 126 can be selected by a multiplexer 128, and the thus-selected data can be output to the operation part of the global processor 102. In this configuration, it is possible to use data of in the table RAM 126 as operation data, and, also to use the table RAM 126 as a normal data RAM.

The reason why the output data of the table RAM 126 is selected by the multiplexer 128 is as follows: When the table RAM 126 has a configuration such as to be able to output 8 sets of data after conversion as mentioned above, an output port of total 64 bits (8 sets each including 8 bits) is needed for the RAM. However, in the above-described global processor 102, only maximum 16 bits can be processed. By the multiplexer 128 mentioned above in the second variant embodiment, 16 bits (two sets each including 8 bits) are selected from these 64 bits. It is also possible to additionally provide an output port for operation data of the global processor 102 to the table RAM 126. However, when the RAM has two ports, the costs increases.

In the second variant embodiment of the second embodiment, the registers 131c shown in FIG. 10 are used for the table conversion. However, instead, it is also possible to employ the registers 310c shown in FIG. 14.

Figure 16:
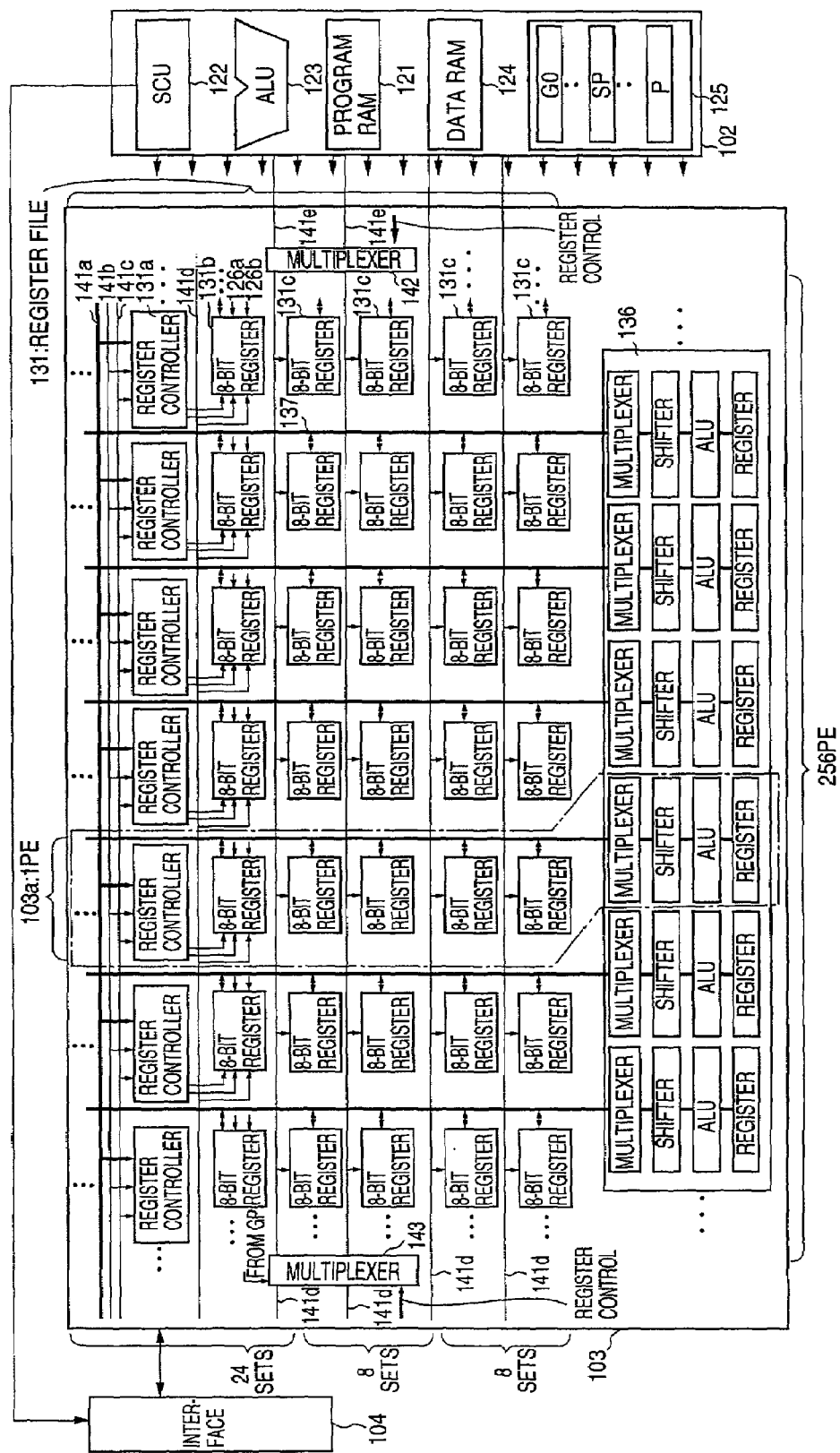
FIG. 16 is a block diagram showing a partial internal configuration of a third variant embodiment of the second embodiment shown in FIG. 8.

A third variant embodiment of the second embodiment will now be described with reference FIG. 16. The basic configuration thereof is the same as that of the second embodiment shown in FIG. 10, the same reference numerals are given to the same parts/components, and the duplicated description thereof is omitted.

In the third variant embodiment of the second embodiment, a configuration is made such that the number of registers out of the registers of the register file 131 which can be accessed externally can be changed. In the embodiment, a configuration is made such that a selection can be made from a configuration such that external data input to two registers can be performed and another configuration such that these two registers can be used for the table conversion. In order to enable this selection, multiplexers 142 and 143 are provided for selecting as to whether data given to these registers 131c is data given by the data buses 141d for external input or data given by the table data buses 141e. At this time, the register-file control signals are also selected by the multiplexers 142 and 143.

In the third variant embodiment of the second embodiment, the number of the registers which are used for both purposes alternatively is two. However, this number may be changed appropriately according to the use.

In the configuration of the third variant embodiment of the second embodiment, it is possible to easily adapting the configuration of the register file to the particular use of the SIMD processor.

Figure 17:
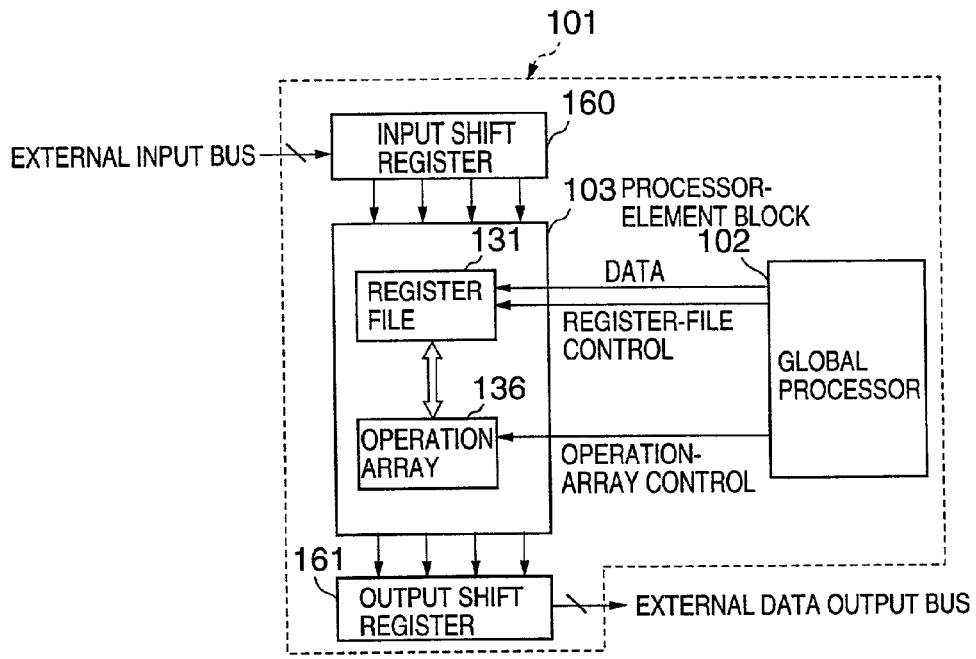
FIG. 17 is a block diagram showing the entire configuration of a fourth variant embodiment of second embodiment shown in FIG. 8.

In the above-described second embodiment and the variant embodiments thereof, the addressing method is employed for external input/output to/from the register file 131, in which the register file 131 is accessed from the outside of the processor 101, the clock, address and read/write control signals are input externally, and, thereby, reading/writing from/to arbitrary registers can be rendered. However, the present invention can also be applied to a processor employing a shift-register method for external input/output. FIG. 17 shows a basic configuration of a fourth variant embodiment of the second embodiment in which the shift-register method is employed.

As shown in FIG. 17, an input shift register 160 for temporarily storing input image data and an external shift register 161 to which image data having undergone non-linear processing is input in parallel are included. To the input shift register 160, external image data sent from an image scanner or the like is given via an external data bus. In the input shift register 160, parallel-n-bit data is shifted in sequence bit by bit. The number of stages of the input shift register 160 corresponds to the number of the processor elements 103a, and, in this embodiment, is 256. Data stored in the input shift register 160 is moved to the register file 131. Writing operation to the register file 131 is performed from the respective stages of the shift register 160 simultaneously. When the data is thus stored in the register file 131, non-linear processing according to the above-described method in any of the second embodiment and the variant embodiments thereof of the present invention is performed by the operation array.

The data having undergone the non-linear processing and stored in the register file 131 is transferred to respective stages of the output shift register 161. The number of the stages of the shift register 161 also corresponds to the number of processor elements 103a. The data is transferred to the respective stages of the shift register 161 from the register file 131 simultaneously. Then, by a clock signal given to the output shift register 161, the data is output therefrom serially. Then, the output data is temporarily stored in a buffer memory or the like, and, then, is given to an external output device such as a printer.

Thus, also in a case employing the shift-register method, it is possible to render non-linear processing effectively by applying the present invention.

Figure 18:
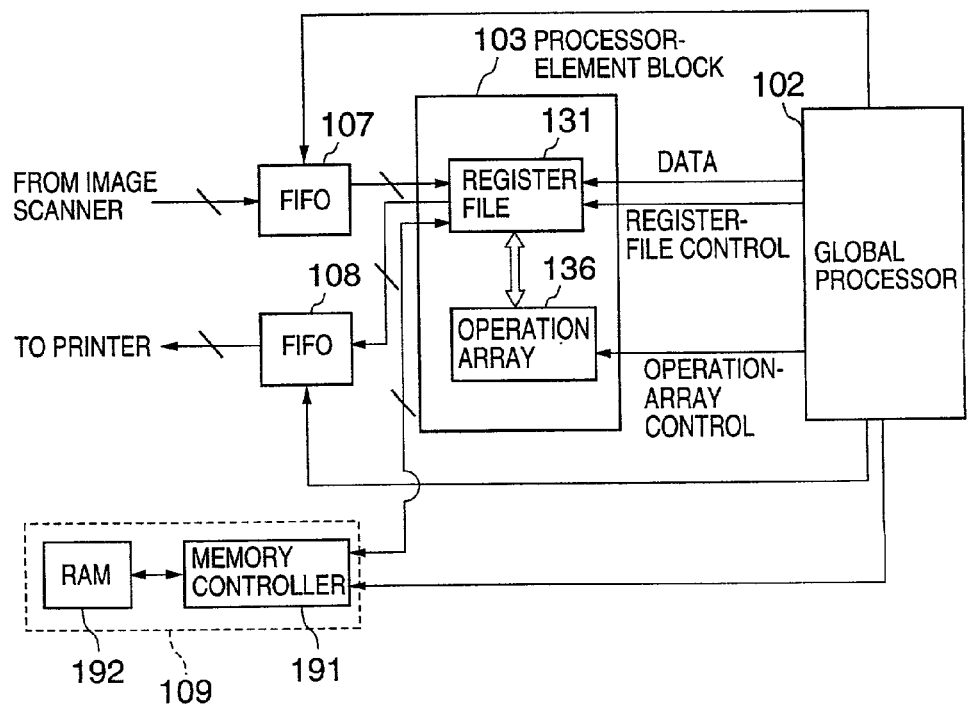
FIG. 18 is a block diagram showing an image processing apparatus in the fifth embodiment of the present invention.

A fifth variant embodiment of the second embodiment of the present invention will now be described with reference to FIGS. 18, 19 and 20. The fifth variant embodiment of the second embodiment is a configuration for using the SIMD processor 101 in an image processing apparatus such as a digital copier.

Image data (digital image data of n bits) read in through an image scanner is given to a FIFO 107 from an external data bus. When image data for one scan line is stored in the FIFO 107, 256 sets of image data are given to the register file 131 according to the control signal from the global processor 102 of the SIMD processor 101.

As described above, in this embodiment, the register file 131 includes the 32 registers each of 8 bits for each PE, and the registers for the 256 PEs form the array configuration. The registers for each PE are called R0, R1, R2, . . . , R31. Each register has one reading port and one writing port for the operation array, and is accessed by the operation array by using the bus 137 of 8 bits for both reading/writing. The 24 registers (R0 through R23) of the 32 registers can be accessed from the outside of the processor 101. Reading/writing from/to arbitrary registers can be rendered by inputting the clock, address and read/write control signals externally.

The remaining 8 registers (R24 through R31) are used for temporarily storing operation data of PE operation. However, it is also possible to write data thereto from the table RAM according to instructions from the global processor 102. This writing of data is such that, according to the write control by the global processor 102 and the condition in the condition register 135c of operation array 136, data in the table RAM can be written to the 8 registers built in the register file 131 for each of the PEs for which the condition is satisfied, simultaneously.

The 16-bit ALU, and 16-bit A-register a d F-register are built in the operation array 136. Operation in response to PE instructions is such that data read out from the register file 131 or data given by the global processor 102 is input to an input terminal of the ALU, and, to the other input terminal of the ALU, the contents of the A-register are input. Then, the operation result of the ALU is stored in the A-register. Accordingly, operation is performed on the contents of the A-register and data in the registers R0 through R31 or data given by the global processor 102.

The image data transferred from the FIFO 107 and stored in the register file 131 undergoes the table conversion for non-linear processing based on any of the embodiments shown in FIGS. 10 through 17. That is, the data to undergo the operation processing stored in the register R0 of the register file 131 is used for determination as to whether or not the condition is satisfied through coincidence operation or value comparison operation by the operation array 136, and data after conversion is written only to the PEs 103a for which the condition is satisfied. That is, the global processor 102 outputs an address at which the data after conversion corresponding to the data to be converted is stored, to the table RAM 126, and gives the data after conversion to the registers 131c of the register file 131 of each of all the PEs 103a via the table data bus. Then, receiving the write signal and condition satisfaction signal, only each of the PEs for which the condition is satisfied writes the contents of the table data bus to the own registers 131c. Thus, the table conversion is finished based on any of the embodiments shown in FIGS. 10 through 17 described above.

The data having undergone the non-linear processing stored in the register file 131 is transferred to a FIFO 108. When image data for one scan line is thus stored in the FIFO 108, the data is transferred to an external output apparatus such as a printer.

Further, it is also possible to previously storing image data into a line memory 109, transfer the data to the processor-element block 103 from the line memory 109, and then store the data having undergone the non-linear processing into the line memory 109. At this time, data transfer is rendered in a manner such that data is input/output to/from a RAM 192 via a memory controller 191.

Figure 19:
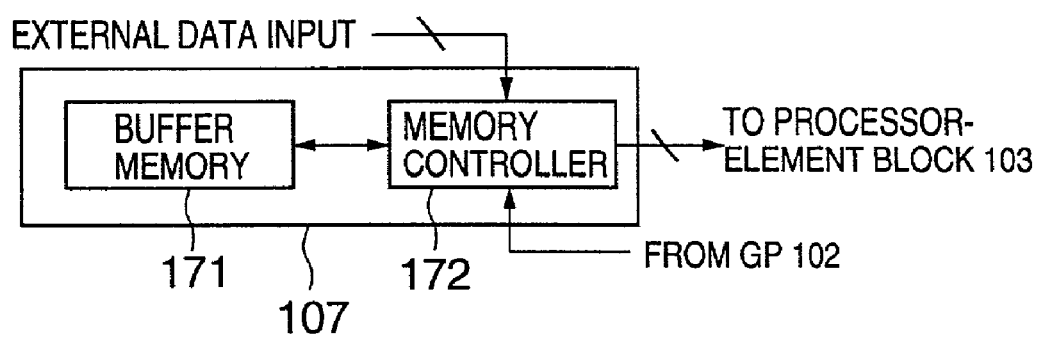
FIG. 19 is a block diagram showing an example of a FIFO for inputting shown in FIG. 18.
Figure 20:
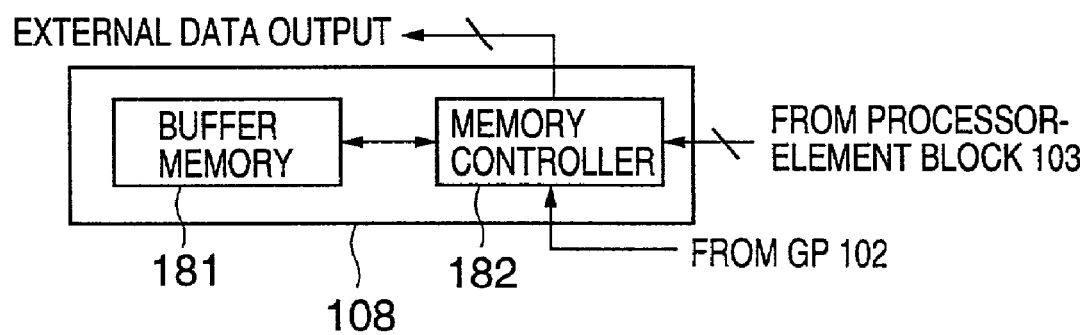
FIG. 20 is a block diagram showing an example of a FIFO for outputting shown in FIG. 18.

FIG. 19 shows one example of the FIFO 107, and FIG. 20 shows one example of the FIFO 108. The FIFOs 107 and 108 include memory controllers 172, 182 and buffer memories 171, 181. Input of external data is rendered in a manner such that data is stored in the buffer memory 171 via the memory controller 172, and, when image data for one scan line is stored in the buffer memory 171, the memory controller 172 transfers the data to the processor-element block 103 therefrom. External data output is rendered in a manner such that data is stored into the buffer memory 181 via the memory controller 182 from the processor-element block 103. When data for one scan line is stored in the buffer memory 181, the memory controller 182 transfers the data externally therefrom.

In the image processing apparatus described above, image data read in through an image scanner is output to a printer. However, it is not necessary to be limited thereto, and, the present invention may also be applied to a digital video tape recorder, a video camera, or the like, in which digital image data is caused to undergo non-linear processing. Further, external output is not limited to one to a printer, and, the present invention may be applied to an apparatus in which image data is output to a display device, simply transferred, or the like.

The present invention is not limited to the above-described embodiments, and variations and modifications may be made without departing from the scope of the present invention.

The present application is based on Japanese priority applications Nos. 2000-020130 and 2000-009879, filed on Jan. 28, 2000 and Jan. 19, 2000, respectively, the entire contents of which are hereby incorporated by reference.

What is claimed is:

1. A parallel processor comprising:
a global processor interpreting a program and controlling the entirety of the parallel processor; and
a processor-element block comprising a plurality of processor elements each comprising a register file and an operation array for processing a plurality of sets of data,
wherein said global processor assigns to said plurality of processor elements respective processor-element numbers, and outputs a control signal to said plurality of processor elements, and, thereby, sets the assigned processor-element numbers corresponding to said plurality of processor elements as input values of the operation arrays, respectively, and wherein said plurality of processor elements are divided into pairs of an even-numbered processor element and an odd-numbered processor element, each pair specified by a single address such that write data is transferred to one of the even-numbered processor element and the odd-numbered processor element and read data is read from the other, by a single addressing operation.

2. The parallel processor as claimed in claim 1, wherein data from a general-purpose register of said global processor is transferred to arbitrary processor elements of said plurality of processor elements.

3. The parallel processor as claimed in claim 2, wherein the data transfer is rendered through specifying a range from a first specific processor element through a second specific processor element by specifying immediate values by using operands.

4. The parallel processor as claimed in claim 2, wherein
the data transfer is rendered through specifying bits such as to specify processor elements matching processor-element numbers expressed in binary notation; and
specifying processor elements by masking arbitrary bits of the specified bits, through specifying immediate values by using operands.

5. The parallel processor as claimed in claim 2, wherein the data transfer is rendered through specifying by a pointer using a general-purpose register of said global processor.

6. The parallel processor as claimed in claim 5, wherein the specifying by a pointer comprises incrementing of data in said general-purpose register after the specifying.

7. The parallel processor as claimed in claim 1, wherein each processor element comprises a plurality of flag bits for controlling, according to a state of the sets of data, as to whether or not the operation processing is to be executed, according to whether or not a condition is satisfied, and, renders AND/OR operation on a specific bit of said flag bits.

8. The parallel processor as claimed in claim 7, wherein specifying of said flag bits is rendered by specifying a range from a first specific processor element through a second specific processor element through specifying the immediate values by using operands.

9. The parallel processor as claimed in claim 7,
wherein specifying of said flag bits is rendered through specifying bits such as to specify processor elements matching processor-element numbers expressed in binary notation; and
specifying processor elements by masking arbitrary bits of the specified bits through specifying the immediate values by using the operands.

10. The parallel processor as claimed in claim 7, wherein specifying of said flag bits is rendered through specifying by a pointer using a general-purpose register of said global processor.

11. The parallel processor as claimed in claim 10, wherein the specifying by a pointer comprises incrementing of data in said general-purpose register after the specifying.

12. The parallel processor as claimed in claim 1, wherein each processor element further includes a shift and expansion circuit

* * * * *